US009178665B2

(12) United States Patent
Enomoto et al.

(10) Patent No.: US 9,178,665 B2
(45) Date of Patent: Nov. 3, 2015

(54) COMMUNICATION APPARATUS, COMMUNICATION SYSTEM, ABSENT PACKET DETECTING METHOD AND ABSENT PACKET DETECTING PROGRAM

(75) Inventors: Nobuyuki Enomoto, Tokyo (JP); Hideyuki Shimonishi, Tokyo (JP); Junichi Higuchi, Tokyo (JP); Youichi Hidaka, Tokyo (JP); Jun Suzuki, Tokyo (JP); Takashi Yoshikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 42 days.

(21) Appl. No.: 13/531,637

(22) Filed: Jun. 25, 2012

(65) Prior Publication Data

US 2012/0263182 A1 Oct. 18, 2012

Related U.S. Application Data

(63) Continuation of application No. 12/200,508, filed on Aug. 28, 2008, now Pat. No. 8,233,483.

(30) Foreign Application Priority Data

Aug. 28, 2007 (JP) .................................. 2007-221164

(51) Int. Cl.
*H04L 1/18* (2006.01)
*H04L 12/707* (2013.01)
(Continued)

(52) U.S. Cl.
CPC .............. *H04L 1/1841* (2013.01); *H04L 1/188* (2013.01); *H04L 1/1874* (2013.01); *H04L 45/24* (2013.01); *H04L 45/28* (2013.01); *H04L 2001/0096* (2013.01)

(58) Field of Classification Search
None
See application file for complete search history.

(56) References Cited

U.S. PATENT DOCUMENTS 5,777,987 A    7/1998  Adams et al.
6,021,124 A *  2/2000  Haartsen ....................... 370/336
(Continued)

FOREIGN PATENT DOCUMENTS

EP      1933509 A1     6/2008
JP      1-291543 A     11/1989
(Continued)

OTHER PUBLICATIONS

Japanese Office Action issued for counterpart application No. JP 2009-270386, dated Apr. 11, 2012.
(Continued)

*Primary Examiner* — Alex Skripnikov
(74) *Attorney, Agent, or Firm* — Arent Fox LLP

(57) ABSTRACT

Any packet loss is detected very quickly by means of only a series of sequence number in a multi-path environment where a transmitter and a receiver are connected to each other by way of a plurality of networks when no inversion of sequence arises in any of the networks. A communication apparatus includes a plurality of sequence buffers arranged at each network to accumulate packets until a sequence acknowledgement and an absence detecting section adapted to determine the occurrence of an absence of a packet when one or more packets are accumulated in all the sequence buffers. With this arrangement, the absence detecting section of the receiver monitors the packets staying in the sequence guaranteeing buffer arranged in each of the network, paying attention to the characteristic that packets are stored in the sequence buffers of all the networks when a packet loss takes place.

12 Claims, 16 Drawing Sheets

(51) Int. Cl.
*H04L 12/703* (2013.01)
*H04L 1/00* (2006.01)

(56) References Cited

U.S. PATENT DOCUMENTS

| | | |
|---|---|---|
| 6,160,808 A | 12/2000 | Maurya |
| 6,205,498 B1 | 3/2001 | Habusha et al. |
| 6,363,069 B1 * | 3/2002 | Levy et al. .................... 370/389 |
| 6,408,003 B1 | 6/2002 | Rezaiifar et al. |
| 6,412,013 B1 | 6/2002 | Parthasarathy et al. |
| 6,678,249 B2 | 1/2004 | Toskala et al. |
| 7,433,363 B2 * | 10/2008 | Rosen et al. .................... 370/413 |
| 2002/0181506 A1 | 12/2002 | Luginov |
| 2008/0186973 A1 | 8/2008 | Shihara et al. |
| 2009/0268747 A1 | 10/2009 | Kurata et al. |

FOREIGN PATENT DOCUMENTS

| | | |
|---|---|---|
| JP | 04-077155 A | 3/1992 |
| JP | 05-110600 A | 4/1993 |
| JP | 5-260060 A | 10/1993 |
| JP | 06-104897 | 4/1994 |
| JP | 10-229429 A | 8/1998 |
| JP | 2846443 | 10/1998 |
| JP | 11-215185 A | 8/1999 |
| JP | 2000-216815 | 8/2000 |
| JP | 2000-261478 | 9/2000 |
| JP | 2001-111608 A | 4/2001 |
| JP | 2001-244982 | 9/2001 |
| JP | 2001-352359 A | 12/2001 |
| JP | 2003-110604 | 4/2003 |
| JP | 2003-174483 | 6/2003 |
| JP | 2003-241987 | 8/2003 |
| JP | 2003-281003 | 10/2003 |
| JP | 2003-333073 A | 11/2003 |
| JP | 2004-080139 A | 3/2004 |
| JP | 2004-94290 | 3/2004 |
| JP | 2004-234045 | 8/2004 |
| JP | 2004-246759 | 9/2004 |
| JP | 2004-348292 | 12/2004 |
| JP | 2004-362012 | 12/2004 |
| JP | 2005-157421 | 6/2005 |
| JP | 2005-197815 | 7/2005 |
| JP | 2005-258514 | 9/2005 |
| JP | 2005-321897 | 11/2005 |
| JP | 2006-252256 | 9/2006 |
| JP | 2007-060494 A | 3/2007 |
| JP | 2009-55114 | 3/2009 |
| WO | WO-98/41919 | 9/1998 |
| WO | WO-2004/086697 | 10/2004 |
| WO | WO-2007/063585 A1 | 6/2007 |

OTHER PUBLICATIONS

Japanese Office Action issued for counterpart JP Application No. 2012-132057 dated Jun. 27, 2013 (with English translation of relevant parts in Office Action).

* cited by examiner

COMMUNICATION APPARATUS, COMMUNICATION SYSTEM, ABSENT PACKET DETECTING METHOD AND ABSENT PACKET DETECTING PROGRAM

CROSS REFERENCE TO RELATED APPLICATIONS

This application is a continuation of application Ser. No. 12/200,508, filed Aug. 28, 2008, which is based upon and claims the benefit of priority from Japanese patent application No. 2007-221164, filed on Aug. 28, 2007, the disclosure of each of which are incorporated herein in their entirety by reference.

BACKGROUND OF THE INVENTION

1. Field of the Invention

This invention relates to a communication technique for extending the band by distributing data to a plurality of paths. More particularly, the present invention relates to a communication apparatus, a communication system, an absent packet detecting method and an absent packet detecting program for detecting any packet loss (absence) very quickly by means of only a series of sequence number in a multi-path environment where a transmitter and a receiver are connected to each other by way of a plurality of networks when no inversion of sequence arises in any of the networks.

2. Description of the Related Art

Communication techniques of branching a single communication flow of date being used between a transmitting terminal and a receiving terminal into a plurality of flows and restoring the original flow are known. They include a proposed method of arranging gateways respectively at the first LAN (local area network) to which the transmitting terminal belongs and the second LAN to which the receiving terminal belongs, allocating the data of the TCP (transmission control protocol) transmitted from the transmitting terminal to communication paths at the gateway of the first LAN on the basis of units of packets and restoring the data at the gateway of the second LAN, correcting the inverted sequence of the packets received from the plurality of communication paths according to the sequence numbers of the TCP (see, for example, Patent Document 1: JP 2000-261478A).

They also include a proposed method of utilizing efficiently a plurality of communication lines and improving the capacity factor of the communication lines by adding functions to the TCP of terminals so as to utilize a plurality of TCP connections for communications that hitherto employ only a single TCP connection (see, for example, Patent Document 2: JP 2003-110604A). With such a method, the communication that is realized by a single communication flow from the transmitting terminal to the receiving terminal is divided into a plurality of communication flows and a data is transmitted in parallel. When data is transmitted from a transmitting terminal to a receiving terminal, the communication protocol of the transmitting terminal divides the data of the single communication flow into a plurality of communication flows and adds a new header to each TCP/IP packet as restoration information for restoring the plurality of communication flows produced by the division to the original single communication flow (by using two series of sequence numbers) in order to transmit the data by way of a plurality of communication flows. The communication protocol of the receiving terminal restores the original single communication flow from the plurality of communication flows by referring to the restoration information of the data it receives.

However, the above-described known methods are accompanied by problems.

The first problem is that a packet loss is detected only slowly.

The communication method described in the Patent Document 1 is designed to determine the absence of a packet by seeing the abnormal sequence, if any, on the basis of an assumption that the TCP of a terminal is employed on a single communication path. Therefore, an erroneous detection of an absent packet (a packet loss or an abandoned packet) occurs when a plurality of communication paths are employed for communication and inversion of sequence arises due to the difference of delay time of the communication paths. In other words, the method cannot discriminate an abandoned packet and inversion of sequence. When any absent packet due to an abnormal sequence is neglected in order to avoid this problem, detection of a packet loss becomes a slow operation because an absent packet can be determined only by means of retransmission timeout.

The TCP employs detection of a packet loss as trigger for retransmission. Therefore, when a packet loss is detected only slowly, the retransmission also starts only slowly to reduce the throughput. Then, the potential of the communication paths cannot be exploited satisfactorily.

The second problem is a rise of communication cost.

The communication method described in the Patent Document 2 requires headers arranged in two stages and two series of sequence numbers. Two series of sequence numbers by turn requires a complex arrangement for packet transfers and system management to raise the communication cost.

SUMMARY OF THE INVENTION

In view of the above-identified circumstances, it is therefore the object of the present invention to provide a communication apparatus, a communication system, an absent packet detecting method and an absent packet detecting program for detecting any packet loss (absence) very quickly by means of only a series of sequence number in a multi-path environment where a transmitter and a receiver are connected to each other by way of a plurality of networks when no inversion of sequence arises in any of the networks (in other words, discriminating an abandoned packet and inversion of sequence very quickly by means of only a series of sequence numbers).

In an aspect of the present invention, the above object is achieved by providing a communication apparatus including: a plurality of sequence buffers arranged at each network to accumulate packets until a sequence acknowledgement; and an absence detecting section adapted to determine the occurrence of an absence of a packet when one or more packets are accumulated in all the sequence buffers.

With the above-described arrangement, the object of the present invention can be achieved by monitoring the packets staying in the sequence guaranteeing buffer arranged in each of the networks, paying attention to the characteristic that packets are stored in the sequence buffers of all the networks when a packet loss takes place.

In another aspect of the present invention, there is provided a communication apparatus including: a plurality of sequence buffers arranged at each network to accumulate packets until a sequence acknowledgement; a takeout control section for checking the sequence numbers added to packets and taking out packets from the sequence buffers, restoring the sequence of flows; and a storage control section for determining the occurrence of an absence of a packet when any of the sequence buffers overflows.

With the above-described arrangement, the object of the present invention can be achieved by monitoring the overflow, if any, of the sequence buffer arranged in each of the networks, paying attention to the characteristic that no packet can be taken out from a sequence buffer in an abnormal situation and overflow takes place in the buffer.

In still another aspect of the present invention, there is provided a communication apparatus including: a plurality of sequence buffers arranged at each network to accumulate packets until a sequence acknowledgement; a takeout control section for checking the sequence numbers added to packets and taking out packets from the sequence buffers, restoring the sequence of flows; a storage control section for determining the occurrence of an absence of a packet when any of the sequence buffers overflows; a capacity determining section for determining the capacity of each of the sequence buffers on the basis of the band and the delay time of each of the networks; and a built-in clock for providing clock time information for computing the delay time.

With the above-described arrangement, the object of the present invention can be achieved by monitoring the overflow, if any, of the sequence buffer arranged in each of the networks to detect any trouble so that the capacity determining section of the receiver defines a necessary minimal capacity as the capacity of the sequence buffers from the difference of delay time of each of the networks and the band, paying attention to the characteristic that no packet can be taken out from a sequence buffer in an abnormal situation and overflow takes place in the buffer.

Now, the advantages of the present invention will be described below.

The first advantage is that any packet loss can be detected very quickly by means of only a series of sequence number in a multi-path environment where a transmitter and a receiver are connected to each other by way of a plurality of networks when no inversion of sequence arises in any of the networks.

This is because the absence detecting section of the receiver monitors the packets staying in the sequence guaranteeing buffer arranged in each of the networks, paying attention to the characteristic that packets are stored in the sequence buffers of all the networks when a packet loss takes place.

Additionally, this is because the storage control section of the receiver monitors the overflow, if any, of the sequence buffer arranged in each of the networks, paying attention to the characteristic that no packet can be taken out from a sequence buffer in an abnormal situation and overflow takes place in the buffer.

Furthermore, this is because, when the storage control section of the receiver monitors the overflow, if any, of the sequence buffer arranged in each of the networks to detect any trouble so that the capacity determining section of the receiver defines a necessary minimal capacity as the capacity of the sequence buffers from the difference of delay time of each of the networks and the band, paying attention to the characteristic that no packet can be taken out from a sequence buffer in an abnormal situation and overflow takes place in the buffer.

The second advantage is the retransmission can be started very quickly by means of only a series of sequence number in a multi-path environment where a transmitter and a receiver are connected to each other by way of a plurality of networks when a packet loss takes place and no inversion of sequence arises in any of the networks.

This is because any absence of a packet can be detected very quickly without relying on a retransmission timer as the absence detecting section of the receiver monitors the packets staying in the sequence guaranteeing buffer arranged in each of the networks, paying attention to the characteristic that packets are stored in the sequence buffers of all the networks when a packet loss takes place.

Additionally, this is because an overflow of a buffer can be used as trigger for starting a retransmission as the storage control section of the receiver monitors the overflow, if any, of the sequence buffer arranged in each of the networks, paying attention to the characteristic that no packet can be taken out from a sequence buffer in an abnormal situation and overflow takes place in the buffer.

Further more, this is because, when the storage control section of the receiver monitors the overflow, if any, of the sequence buffer arranged in each of the networks and utilizes the overflow as trigger for starting a retransmission, the capacity determining section of the receiver defines a necessary minimal capacity as the capacity of the sequence buffers from the difference of delay time and the band, paying attention to the characteristic that no packet can be taken out from a sequence buffer in an abnormal situation and overflow takes place in the buffer.

DETAILED DESCRIPTION OF THE PREFERRED EMBODIMENTS

Figure 1:
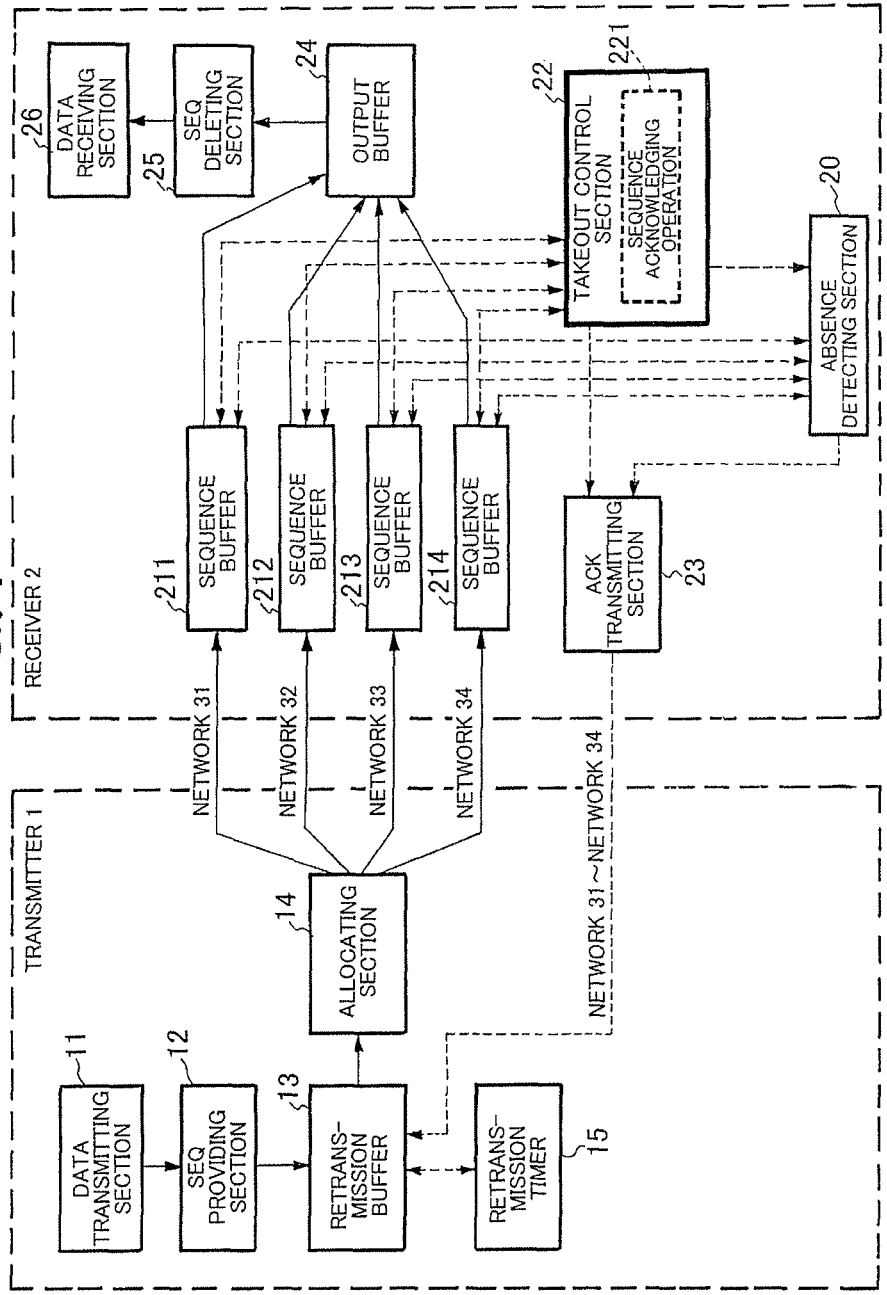
FIG. 1 is a schematic block diagram according to a first embodiment of the present invention, showing the configuration thereof.

Now, the present invention will be described in greater detail by referring to the accompanying drawings that illustrate preferable embodiments of the invention.

In the following description, the communication between a transmitter and a receiver is defined as a flow. The route through which the flow takes place is defined as a path. Communication is realized by means of four paths when a flow of communication is distributed to four networks, whereas communication is realized by means of eight paths when two flows of communication are distributed to four networks. However, in the following description, a network may practically appear to be a synonym of a path because attention is paid almost exclusively to a flow.

First Embodiment

Description of the Configuration Thereof

Now, the configuration of this embodiment will be described by referring to FIG. 1.

Transmitter 1 includes a data transmitting section 11, a SEQ providing section 12, a retransmission buffer 13, an allocating section 14 and a retransmission timer 15.

The data transmitting section 11 generates the data to be transmitted to receiver 2 and hands it over to the SEQ providing section 12. Generally, the data transmitting section 11 is realized by a server application.

The SEQ providing section 12 receives the data to be transmitted to the receiver 2 from the data transmitting section 12 and divides them into data of a size transferable by way of networks 31 through 34. Then, it defines for each data produced by the division a header and a sequence number (to be referred to simply as SEQ hereinafter) necessary for transferring it and delivers it to the retransmission buffer 13.

The retransmission buffer 13 is an FIFO buffer and operates in a manner as described below.

(1) It receives packets provided with respective SEQs from the SEQ providing section 12 and stores it.

(2) It transmits copies of the packets to the allocating section 14, referring to the predetermined speed and the predetermined number of packets. It sets the retransmission timer 15 for operation at this time.

(3) It receives a transmission acknowledgement from ACK transmitting section 23 and erases the stored packets with the sequence numbers not greater than the received sequence number described on the ACK. At this time, it resets the retransmission timer 15.

(4) When the sequence number described on the ACK is same as the sequence number described on the ACK it received last, it takes the ACK for a retransmission request (duplicate ACK) and retransmits the copies of the packets of the sequence numbers from the one described on the ACK to the allocating section 14, referring to the predetermined speed and the predetermined number of packets, as in (2).

(5) When the retransmission timer 15 tells timeout, it retransmits copies of the packets of the sequence numbers from the one described on the ACK it received last and to the allocating section 14, referring to the predetermined speed and the predetermined number of packets, as in (2).

The allocating section 14 sequentially allocates the packets received from the retransmission buffer 13 to the networks 31 through 34 on a round robin basis.

As the retransmission timer 15 receives a set request from the retransmission buffer 13, it notifies the retransmission buffer 13 of timeout when a predetermined time period has elapsed.

The receiver 2 includes sequence buffers 211 through 214, an absence detecting section 20, a takeout control section 22, an ACK transmitting section 23, an output buffer 24, a SEQ deleting section 25, a data receiving section 26.

The sequence buffer 211 is an FIFO buffer. It receives packets from the network 31 and temporarily stores them. Then, it transmits a storage completion notice to the takeout control section 22. It also transfers the packets it stored in the output buffer 24 according to the directive from the takeout control section 22.

The sequence buffer 211 compares the sequence number of the packets it receives from the network 31 and the sequence number of the packets it received last time from the network 31 and, when the SEQ of the packets it receives this time is smaller than or equal to the SEQ of the packets it received last time, it considers that a retransmission takes place and abandons all the stored packets.

The sequence buffer 212 is also an FIFO buffer. It receives packets from the network 32 and temporarily stores them. Then, it transmits a storage completion notice to the takeout control section 22. It also transfers the packets it stored in the output buffer 24 according to the directive from the takeout control section 22.

The sequence buffer 212 compares the sequence number of the packets it receives from the network 32 and the sequence number of the packets it received last time from the network 32 and, when the SEQ of the packets it receives this time is smaller than or equal to the SEQ of the packets it received last time, it considers that a retransmission takes place and abandons all the stored packets.

The sequence buffer 213 is also an FIFO buffer. It receives packets from the network 33 and temporarily stores them. Then, it transmits a storage completion notice to the takeout control section 22. It also transfers the packets it stored in the output buffer 24 according to the directive from the takeout control section 22.

The sequence buffer 213 compares the sequence number of the packets it receives from the network 33 and the sequence number of the packets it received last time from the network 33 and, when the SEQ of the packets it receives this time is smaller than or equal to the SEQ of the packets it received last time, it considers that a retransmission takes place and abandons all the stored packets.

The sequence buffer 214 is also an FIFO buffer. It receives packets from the network 34 and temporarily stores them. Then, it transmits a storage completion notice to the takeout control section 22. It also transfers the packets it stored in the output buffer 24 according to the directive from the takeout control section 22.

The sequence buffer 214 compares the sequence number of the packets it receives from the network 34 and the sequence number of the packets it received last time from the network 34 and, when the SEQ of the packets it receives this time is smaller than or equal to the SEQ of the packets it received last time, it considers that a retransmission takes place and abandons all the stored packets.

As the absence detecting section 20 receives a packet takeout completion notice from the takeout control section 22, it checks the presence or absence of any packet loss. When it finds a packet loss, it sends a retransmission request to the ACK transmitting section 23.

As the takeout control section 22 receives the storage completion notices from the sequence buffers 211 through 214, it performs a sequence acknowledging operation 221 and transfers the packets to the output buffer 24 according to the SEQ sequence. At this time, the takeout control section 22 notifies the ACK transmitting section 23 transmitted to the output buffer 24 of the SEQ of the packets.

The ACK transmitting section 23 operates in a manner as described below. While the present invention is described in terms of a 1 ACK system, with which the ACK transmitting section 23 transmits an ACK of a packet each time the transfer of a packet to the output buffer 24 is completed, an N_ACK system, with which the ACK transmitting section 23 transmits an ACK of N (N being a natural number not less than 1) arriving packets, may alternatively be used for the purpose of the present invention.

(1) It receives a SEQ notice of the packet transferred from the takeout control section 22 to the output buffer 24. Then, it generates a delivery completion packet (to be indicated as ACK hereinafter), which includes the SEQ, and notifies the retransmission buffer 13 thereof. The ACK is notified of by way of one of the networks 31 through 34. It also stores the SEQ it notifies of.

(2) As it receives a retransmission request from the absence detecting section 20, it generates the ACK again, which includes the SEQ stored in (1), and notifies the retransmission buffer 13 thereof. The ACK of (2) is dealt with as a duplicate ACK (retransmission request) at the retransmission buffer 13. The ACK of (2) is copied and then may be transferred by way of all the networks 31 through 34. However, when the ACK of (2) is transferred by way of all the networks 31 through 34, a lock mechanism needs to be provided at the retransmission buffer 13 in order to prevent retransmission from taking place frequently at the retransmission buffer 13.

The output buffer 24 is an FIFO buffer. It receives packets from the sequence buffers 211 through 214 and stores them. When it receives a request from the SEQ deleting section 25, it outputs the packets to the SEQ deleting section 25 in the order it stored them.

The SEQ deleting section 25 receives packets from the output buffer 24 and deletes the SEQ and the header. Then, it transfers the data from which the SEQ is deleted to the data receiving section 26.

The data receiving section 26 receives data from the SEQ deleting section 26. Generally, it is referred to as client application.

The network 31 is a network connecting the transmitter 1 and the receiver 2. The network 31 is a network in which any sequence of packets is not inverted in it such as Ethernet™. While the network 31 is expressed by a single line in FIG. 1, switches and other elements may be arranged on the network 31 in addition to the link so long as any sequence of packets is not inverted in it. The networks 31, 32, 33 and 34 are isolated from each other physically or logically by means of a VLAN and do not communicate with each other.

The networks 32 through 34 are networks similar to the network 31.

(Description of Operation)

Figure 2:
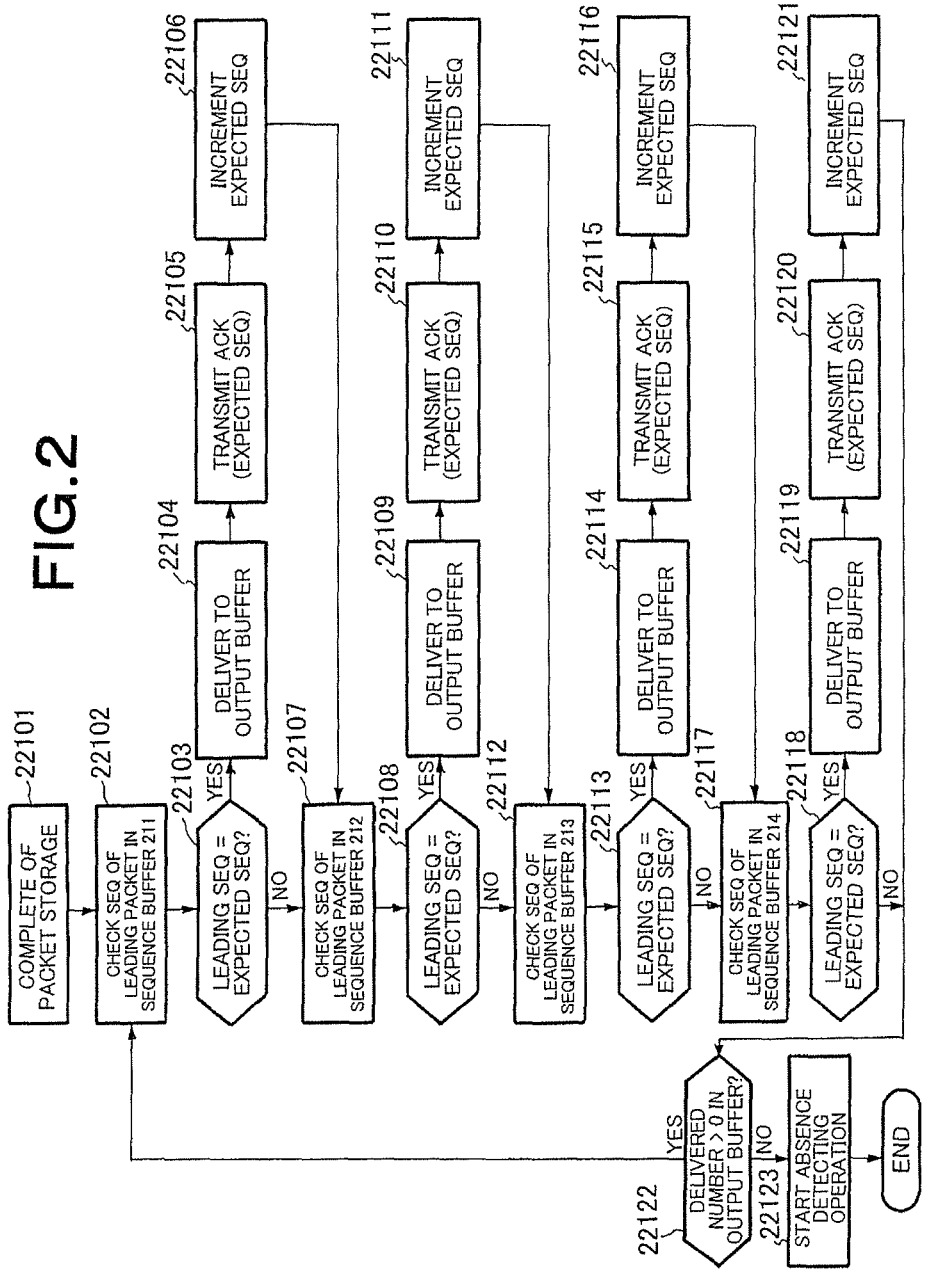
FIG. 2 is a flowchart of the sequence acknowledging operation 221 of the takeout control section 22.

Now, the sequence acknowledging operation 221 of the takeout control section 22 will be described below by referring to the flowchart of FIG. 2.

As a packet is stored in any of the sequence buffers 211 through 214, a storage completion notice is transmitted to the takeout control section 22 and the sequence acknowledging operation 221 is started (Step 22101).

Firstly, the takeout control section 22 checks the SEQ of the packet stored at the leading end (at the output buffer 24 side) of the sequence buffer 211 (Step 22102).

Then, the takeout control section 22 compares the SEQ of the leading packet (leading SEQ) of the sequence buffer 211 it checked in Step 22102 and the SEQ that the takeout control section 22 is transmitting next to the output buffer 24 (reception expected SEQ, to be referred to as expected SEQ hereinafter) (Step 22103).

When it is found in Step 22103 that the leading SEQ and the expected SEQ agree with each other, the takeout control section 22 takes out the packet from the sequence buffer 211 and transmits it to the output buffer 24 (Step 22104).

Then, the takeout control section 22 requests the ACK transmitting section 23 to transmit a delivery acknowledgement packet (ACK). The ACK stores the SEQ of the expected SEQ and notifies the transmitter 1 of the completion of reception and orderly arrangement down to the expected SEQ (Step 22105).

Thereafter, the takeout control section 22 increments the expected SEQ by one. In other words, it makes expected SEQ=expected SEQ+1 (Step 22106).

Then, the takeout control section 22 operates for the sequence buffer 212 in Steps 22107 through 22111, which are similar to Steps 22102 through 22106.

Subsequently, the takeout control section 22 operates for the sequence buffer 213 in Steps 22112 through 22116, which are similar to Steps 22102 through 22106.

Finally, the takeout control section 22 operates for the sequence buffer 214 in Steps 22117 through 22121, which are similar to Steps 22102 through 22106.

While the takeout control section 22 is operating in Steps 22102 through 22121, it counts the number of packets it has taken out from the sequence buffers and transmitted to the output buffer and, if the number of packets is not less than one (Step 22122: YES), it operates once again from Step 22102 and on. If, on the other hand, the number of packets it has taken out from the sequence buffers and transmitted to the output buffer is equal to 0 and hence there is not any packet that can be transferred to the output buffer 23 (and orderly arranged) in the sequence buffers 211 through 214 (Step 22122: NO), it then executes the processing operation of Step 22123.

The takeout control section 22 notifies the absence detecting section 20 of the completion of packet takeout operation and starts the absence detecting section 20 to operate (Step 22123).

Figure 3:
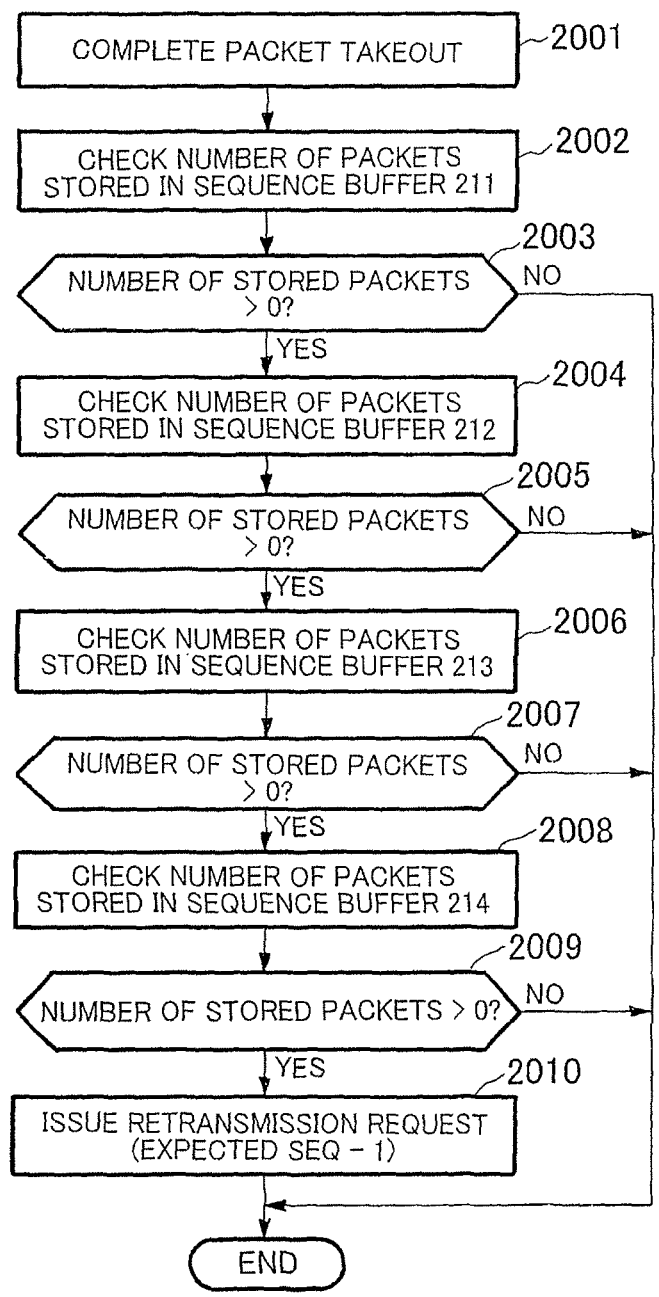
FIG. 3 is a flowchart of the absence detecting operation 222 of the takeout control section 22.

Now, the operation of the absence detecting section 20 will be described below by referring to the flowchart of FIG. 3.

The absence detecting section 20 starts operating in response to the completion of the sequence acknowledging operation 221 (Step 2001).

It checks the number of packets stored in the sequence buffer 211 (Step 2002).

When the number of packets stored in the sequence buffer 211 is equal to 0, the absence detecting section 20 ends the operation. When, on the other hand, the number of packets stored in the sequence buffer 211 is not less than 1, the absence detecting section 20 moves to Step 2004 (Step 2003).

The absence detecting section 20 operates in Steps 2004 and 2005 for the sequence buffer 212 as it does in Steps 2002 and 2003 for the sequence buffer 211.

Then, the absence detecting section 20 operates in Steps 2006 and 2007 for the sequence buffer 213 as it does in Steps 2002 and 2003 for the sequence buffer 211.

Thereafter, the absence detecting section 20 operates in Steps 2008 and 2009 for the sequence buffer 214 as it does in Steps 2002 and 2003 for the sequence buffer 211.

When it is acknowledged that each of all the sequence buffers 211 through 214 stores not less than 1 packet as a result of the execution of Steps 2002 through 2009 (Step 2009: YES), it issues a retransmission request to the ACK transmitting section. Then, the ACK transmitting section generates an ACK (duplicate ACK) containing the SEQ same as the ACK it transmitted last time and issues a retransmission request to the transmitter 1 (Step 2010).

Operation Example

Summary of Operation

Now, the operation of the transmitter 1 and that of the receiver 2 of this embodiment will be summarily described below by referring to FIG. 1.

The data transmitting section 11 generates data for the data receiving section 26 and delivers it to the SEQ providing section 12.

The SEQ providing section 12 generates packets by dividing the data from the data transmitting section 12 to a size, with which it can transfer them by way of the networks 31 through 34 and fitting respective headers to them. Additionally, it allocates sequence numbers (SEQ) to the packets for the purpose of orderly arrangement so that the receiver 2 can restore the data and then transfers them to the retransmission buffer 13.

The retransmission buffer 13 receives the packets from the SEQ providing section 12 and temporarily stores them. Then, it sends out the copies of the packets it stores to the allocating section 14 according to the predefined transmission rate and the window size and other factors.

The allocating section 14 distributes the packets it receives from the retransmission buffer 13 to the networks 31 through 34 on a round robin basis and sends them out. It allocates the packets that are provided with a series of SEQs to the networks 31 through 34 in such a way that, for instance, it allocates the packet with SEQ 15, the packet with SEQ 16, the packet with SEQ 17 and the packet with SEQ 18 respectively to the network 31, the network 32, the network 33 and the network 34.

The networks 31 through 34 deliver the packets sent out from the transmitter 1 to the receiver 2.

The sequence buffer 211 stores the packets arriving from the network 31 and notifies the takeout control section 22 of the completion of storage. As the takeout control section 22 receives the storage completion notice from the sequence buffer 211, it starts a sequence acknowledging operation 221.

The sequence buffers 212 through 214 also store the packets arriving from the respective networks 32 through 34 and notify the takeout control section 22 of the completions of storage. As the takeout control section 22 receives the storage completion notices from each of the sequence buffers 212 through 214, it starts a sequence acknowledging operation 221.

In the sequence acknowledging operation 211, the takeout control section 22 checks the SEQ of the leading packet stored in each of the sequence buffers 211 through 214 and, when the SEQ agrees with the SEQ of the packet to be sent to the output buffer 24 next, it takes out the packet and sends it to the output buffer 24. Then, it requests the ACK transmitting section to transmit ACK. For example, when the transfer of packets down to SEQ=5 has been completed and the packet with SEQ=6 is stored as leading packet in one of the sequence buffers 211 through 214, the takeout control section 22 takes out the packet with SEQ=6 and transfers it to the output buffer 24. Then, the takeout control section 22 requests the ACK transmitting section to transmit ACK for SEQ=6.

When the sequence acknowledging operation 221 cannot find out any packets to be transferred to the output buffer in any of the sequence buffers 211 through 214, it notifies the absence detecting section 20 of the completion of the takeout operation.

The absence detecting section 20 checks the number of packets stored in the sequence buffers 211 through 214 and, when it finds that all the sequence buffers store at least a packet, it issues a retransmission request to the ACK transmitting section.

The output buffer 24 receives packets from the sequence buffers 211 through 214. Then, it takes out packets on an FIFO basis and transfers them in response to a request from the SEQ deleting section 25.

The SEQ deleting section 25 takes out a packet from the output buffer 24 and deletes the header (including SEQ) thereof before it transfers the data to the data receiving section 26.

The data receiving section 26 receives the data from the SEQ deleting section 25 and executes various processes on the data.

When the retransmission buffer 13 receives ACK from the ACK transmitting section 23 by way of any of the networks 31 through 34, it checks the SEQ included in the ACK.

When the SEQ included in the ACK is greater than the SEQ included in the ACK it received last, the retransmission buffer 13 erases the packets down to the SEQ from the retransmission buffer 13. When the SEQ included in the ACK is equal to the SEQ included in the ACK it received last, the retransmission buffer 13 considers it as a duplicate ACK (retransmission request) and retransmits the packets stored in the retransmission buffer sequentially from the smallest SEQ.

(Example of Absence Detecting Operation in Normal Operation)

Now, an example of absence detecting operation of the absence detecting section 20 in a no packet loss condition (normal operation) will be described below by referring to FIG. 4.

Figure 4:
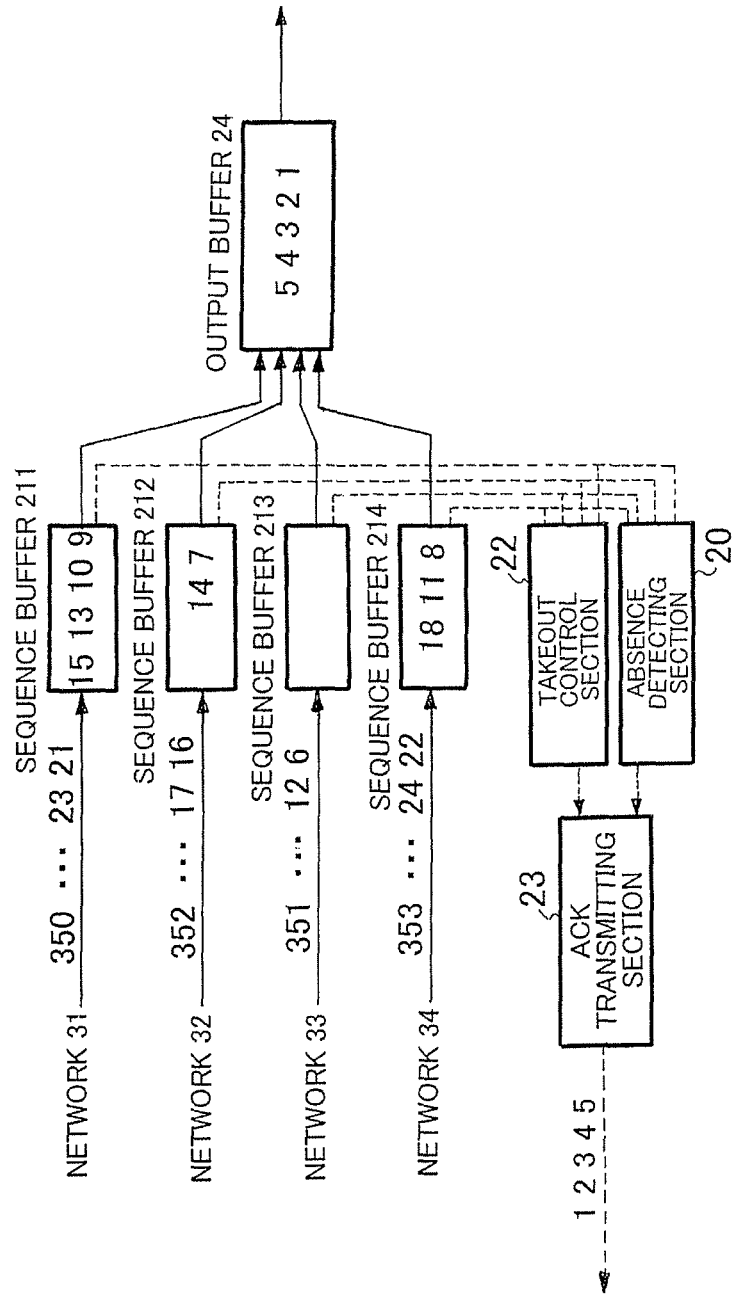
FIG. 4 is a block diagram of an exemplar normal operation of the absence detecting section 222.

FIG. 4 shows an instance where the network 33 shows a delay greater than the networks 31, 32 and 34 and hence the arrival of the packet with SEQ=6 is delayed.

Since the delay of any of the networks 31, 32 and 34 is smaller than the network 33, packets arrive from those networks earlier for the sequence buffers 211, 212 and 214 than the packets arriving from the network 33.

In the instance of FIG. 4, the packets with SEQ 1 through SEQ 5 are transferred to the output buffer 24 and ACK 1 through ACK 5 are sent out from the ACK transmitting section 23 for the packets in the sequence acknowledging operation 221.

In the condition of FIG. 4, the packet 6 is on the network 33 and not stored in the sequence buffer 213 yet. Therefore, the sequence acknowledging operation 221 is completed when the packet with SEQ=5 is transferred to the output buffer 24 and the absence detecting section 20 is notified of the completion of takeout operation.

The absence detecting section 20 checks the number of packets stored in the sequence buffers 212 through 214 and, since the number of packets stored in the sequence buffer 213 is equal to 0, it considers that there is not any absence and completes the operation.

As described above, when no inversion of sequence arises in any of the networks 31 through 34 and no packet loss arises, one or more of the sequence buffers 211 through 214 become vacant without fail.

In a condition where no packet loss arises, packets are accumulated in the sequence buffers 211 through 214 and the number of the packets corresponds to the difference of delay time. Therefore, the number of packets stored in the sequence buffer (sequence buffer 213 in FIG. 4) for storing the packets from the network showing the largest delay (network 33 in FIG. 4) becomes equal to 0.

(Example of Absence Detecting Operation in Abnormal Operation)

Now, an example of absence detecting operation of the absence detecting section 20 in a condition where a packet loss arises (abnormal operation) will be described below by referring to FIG. 5.

Figure 5:
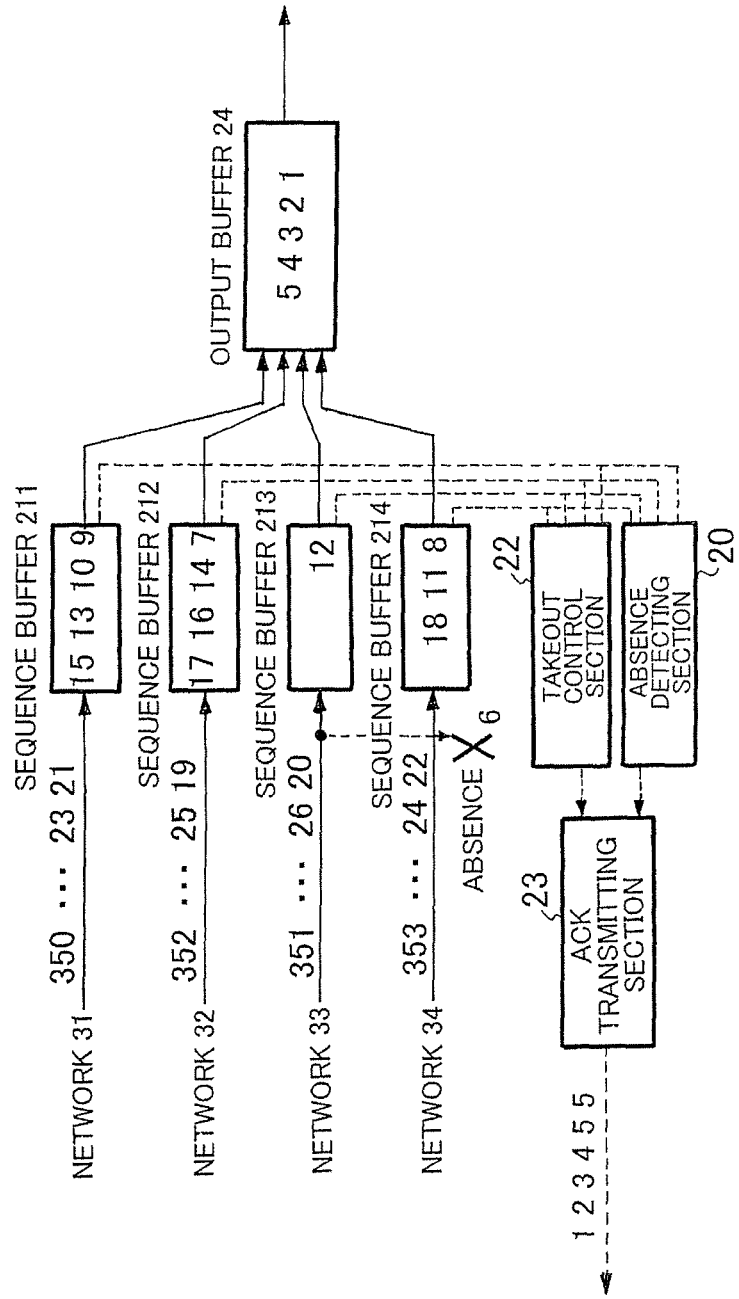
FIG. 5 is a block diagram of an exemplar abnormal operation of the absence detecting section 222.

FIG. 5 shows an instance where the packet with SEQ=6 is lost on the network 33.

Assume that the network 33 shows a delay that is greater than the other networks 31, 32 and 34. In other words, packets arrive earlier for the sequence buffers 211, 212 and 214 than for the sequence buffer 213 because the networks 31, 32 and 34 show a delay smaller than the network 33.

In the instance of FIG. 5, the operation of sequence acknowledgement is completed for the packets with SEQ 1 through SEQ 5 and the packets are transferred to the output buffer 24. In return, ACK 1 through ACK 5 are sent out from the ACK transmitting section 23 for these packets.

The sequence acknowledging operation 221 starts when the packet with SEQ=12, which is sent out to the network 33 next to the absent packet with SEQ=6, is stored in the sequence buffer 213. However, since there is not any packet that can be sent out to the output buffer 24, the absence detecting section 20 is immediately notified of the completion of takeout operation.

Then, the absence detecting section 20 checks the number of packets stored in the sequence buffers 211 through 214. It checks the storage of packets in all the sequence buffers including the sequence buffer 213 and considers that there is an absence of packet. Thus, it issues a retransmission request to the ACK transmitting section 23.

As the ACK transmitting section 23 receives the retransmission request from the absence detecting section 20, it transmits ACKs including the ACK with SEQ=5 (ACK=5) same as the one it transmitted last time. Since the ACKs with the same numbers arrive consecutively, the transmitter 1 determines that there is a retransmission request and retransmits the packets in the retransmission buffer.

As described above, when no inversion of sequence takes place in each of the networks 31 through 34 and a packet loss arises, packets are stored in all the sequence buffers 211 through 214. A packet loss can be determined by means of this feature and hence a retransmission request can be issued very quickly.

When a packet loss determining feature like that of the above-described embodiment is not provided in a multi-path environment, the receiver 2 cannot issue a retransmission request to the transmitter 1 so that the transmitter 1 can only retransmit packets by means of a retransmission timer 15. However, a large value not less than 1 RTT generally needs to be defined for a retransmission timer 15 in order to prevent any operation error from taking place and hence it takes time before starting a packet retransmission. However, with the packet loss determining feature of this embodiment, any absence of packet can be detected and packets can be retransmitted very quickly if compared with the use of a retransmission timer.

Advantages of this Embodiment

The advantages of this embodiment will be described below.

According to the present invention as described above by way of this embodiment, any packet loss can be detected very quickly by using sequence numbers of a single stage in a multi-path environment where a transmitter and a receiver are connected to each other by way of a plurality of networks when no inversion of sequence of packets arises in each of the related networks.

This is because the absence detecting section of the receiver monitors the packets staying in the sequence guaranteeing buffer arranged in each of the networks, paying attention to the characteristic that packets are stored in the sequence buffers of all the networks when a packet loss takes place.

Additionally, according to the present invention as described above by way of this embodiment, a retransmission of packets can be started very quickly when a packet loss takes place, utilizing the management of sequence numbers of a single stage in a multi-path environment where a transmitter and a receiver are connected to each other by way of a plurality of networks when no inversion of sequence of packets arises in each of the related networks.

This is because the absence detecting section of the receiver monitors the packets staying in the sequence guaranteeing buffer arranged in each of the networks, paying attention to the characteristic that packets are stored in the sequence buffers of all the networks when a packet loss takes place so that an absence of a packet can be detected very quickly without relying on a retransmission timer.

Configuration of Second Embodiment

Unlike the first embodiment, no output buffer 24 is provided in the second embodiment of the present invention and either the sequence buffers 211 through 214 operate as output buffer 24 or the takeout rate of the sequence buffers 211 through 214 is low.

(Description of the Configuration Thereof)

Figure 6:
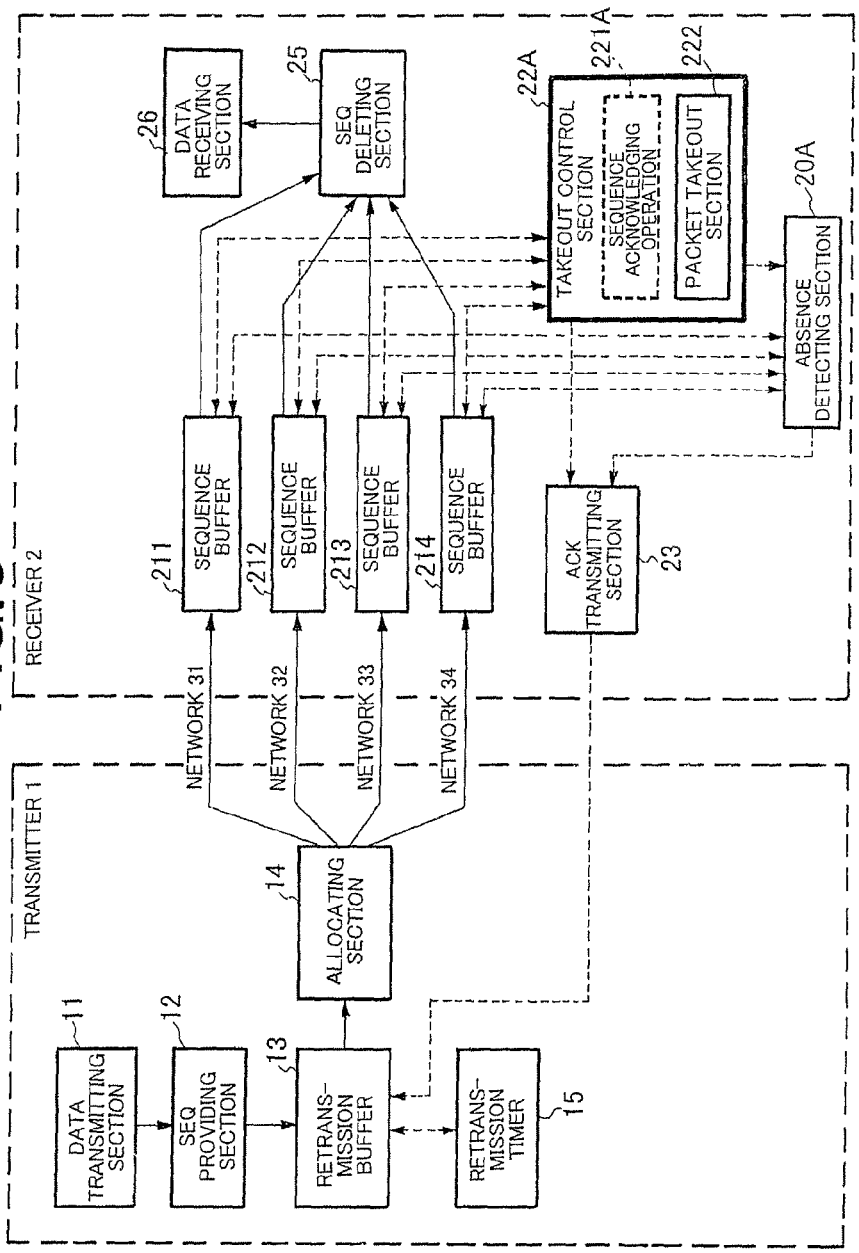
FIG. 6 is a schematic block diagram according to a second embodiment of the present invention, showing the configuration thereof.

Now, the configuration of this embodiment will be described by referring to FIG. 6.

The transmitter 1 has a configuration same as the transmitter 1 of the first embodiment and operates in the same manner.

The receiver 2 differs from the receiver 2 of the first embodiment in that it does not have any output buffer unlike the first embodiment that has an output buffer 24 and that it has an absence detecting section 20A and a takeout control section 22A instead of the absence detecting section 20 and the takeout control section 22 of the first embodiment.

When the absence detecting section 20A receives a takeout completion notice from the takeout control section 22A, it checks if there is any packet loss or not. When it detects a packet loss, it issues a retransmission request to the ACK transmitting section 23.

The takeout control section 22A operates in a manner as described below.

(1) It receives a storage completion notice from each of the sequence buffers 211 through 214 and performs a sequence acknowledging operation 221A. When the sequence of the SEQs is correct, the takeout control section 22A increments the takeout waiting number by one. At this time, it notifies the ACK transmitting section 23 of the SEQ waiting for takeout.

(2) It performs a packet takeout operation 223. It takes out a packet and transfers it to the SEQ deleting section 25 in response to a request from the SEQ deleting section 25.

(Description of Operation)

Figure 7:
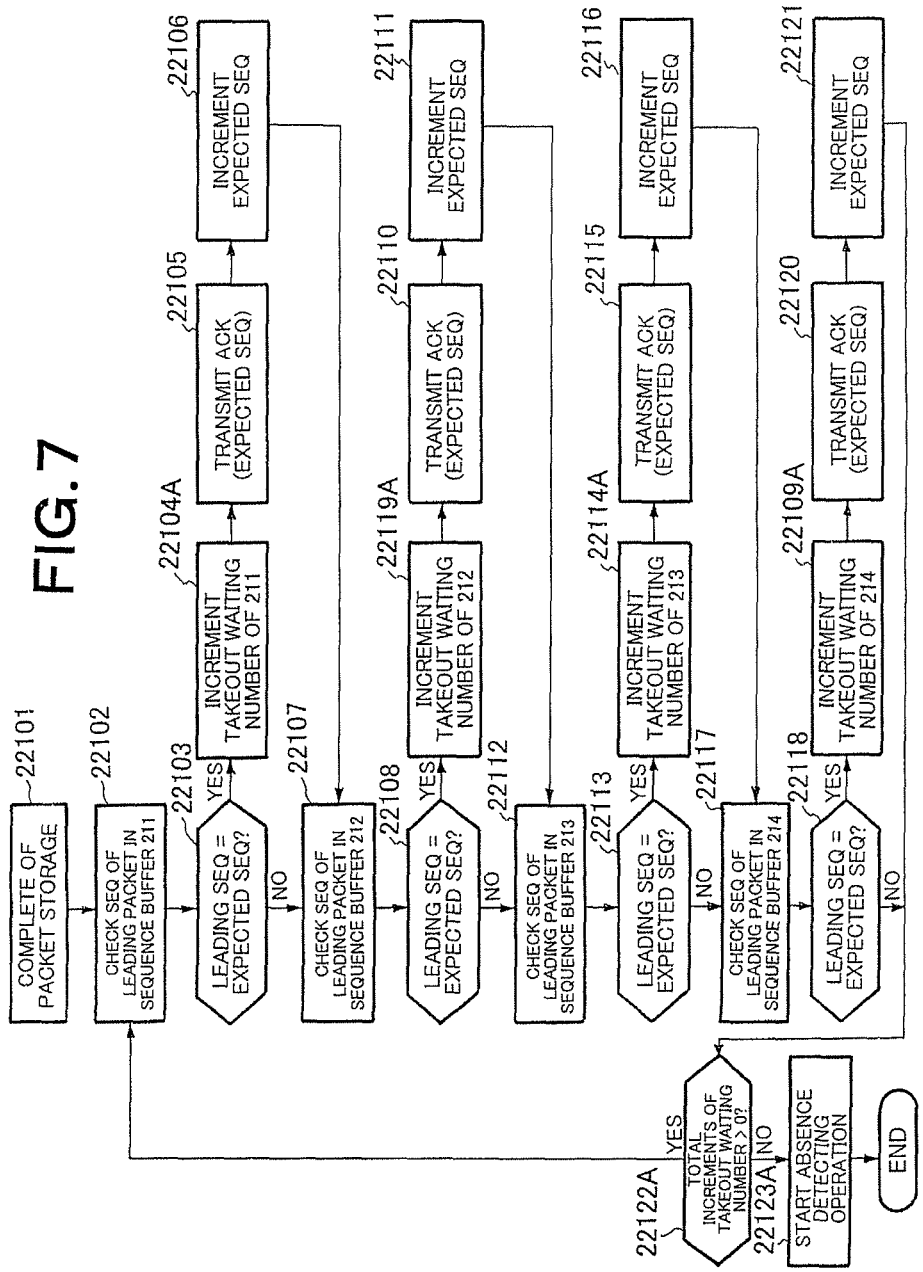
FIG. 7 is a flowchart of the sequence acknowledging operation 221A of the takeout control section 22A.

Now, the sequence acknowledging operation 221A of the takeout control section 22A will be described below by referring to the flowchart of FIG. 7.

As a packet is stored in any of the sequence buffers 211 through 214, a storage completion notice is transmitted to the takeout control section 22A and the sequence acknowledging operation 221 is started (Step 22101).

Firstly, the takeout control section 22A checks the SEQ of the packet stored at the leading end (at the output buffer 24 side) of the sequence buffer 211 (Step 22102).

Then, the takeout control section 22A compares the SEQ of the leading packet (leading SEQ) of the sequence buffer 211 it checked in Step 22101 and the SEQ that the takeout control section 22A is transmitting next to the output buffer 24 (reception expected SEQ, to be referred to as expected SEQ hereinafter) (Step 22103).

When it is found in Step 22103 that the leading SEQ and the expected SEQ agree with each other, the takeout control section 22A increments the takeout waiting number by one (Step 22104A).

Then, the takeout control section 22A requests the ACK transmitting section 23 to transmit a delivery acknowledgement packet (ACK). The ACK stores the SEQ of the expected SEQ and notifies the transmitter 1 of the completion of reception and orderly arrangement down to the expected SEQ (Step 22105).

Thereafter, the takeout control section 22A increments the expected SEQ by one. In other words, it makes expected SEQ=expected SEQ+1 (Step 22106).

Then, the takeout control section 22A operates for the sequence buffer 212 in Steps 22107 through 22111, which are similar to Steps 22102 through 22106.

Subsequently, the takeout control section 22 operates for the sequence buffer 213 in Steps 22112 through 22116, which are similar to Steps 22102 through 22106.

Finally, the takeout control section 22A operates for the sequence buffer 214 in Steps 22117 through 22121, which are similar to Steps 22102 through 22106.

While the takeout control section 22A is operating in Steps 22102 through 22121, it counts the number of times by which it has incremented the takeout waiting number and, when it is not less than one (Step 22122A: YES), it executes the processing steps from Step 22102 on once again. When, on the other hand, the number of packets that has been taken out from the sequence buffers and delivered to the output buffer is 0 (Step 22122A: NO) and hence there is not any packet that can be transferred to the output buffer 23 (and hence arranged orderly) in any of the sequence buffers 211 through 214, it executes the processing operation of Step 22123A.

The takeout control section 22A notifies the absence detecting section 20 of the completion of packet takeout operation (Step 22123A).

Figure 8:
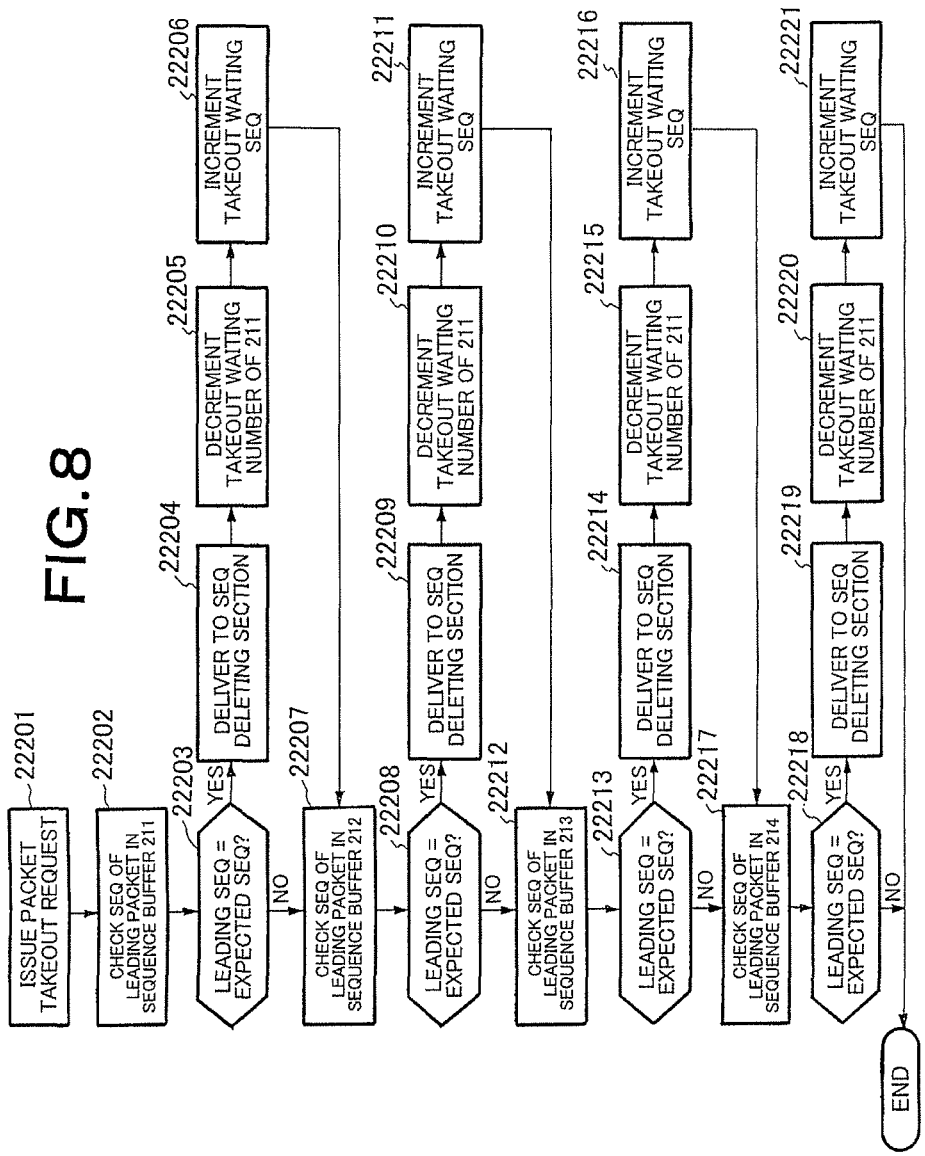
FIG. 8 is a flowchart of the absence detecting operation 222A of the takeout control section 22A.

Now, the packet takeout operation 222 of the takeout control section 22A will be described below by referring to the flowchart of FIG. 8.

The takeout control section 22A starts a packet takeout operation 222 in response to a packet takeout request from the SEQ deleting section 25 (Step 22201).

It then checks the SEQ of the leading packet (at the side of the SEQ deleting section 25) stored in the sequence buffer 211 (Step 22202).

Then, it compares the SEQ of the leading packet (leading SEQ) in the sequence buffer 211 it checked in Step 22202 and the SEQ of the packet that the sequence control section 22 is going to take out next and transmit to the SEQ deleting section 25 (takeout waiting SEQ) (Step 22203).

When the leading SEQ and the takeout waiting SEQ agree with each other in Step 22203, the takeout control section 22A takes out the packet from the sequence buffer 211 and delivers it to the SEQ deleting section 25 (Step 22204).

Then, it decrements the takeout waiting number of the sequence buffer 211 by one (Step 22205).

The takeout control section 22A thereafter increments the takeout waiting SEQ by one. Note that the takeout waiting number and the takeout waiting SEQ are different parameters.

Then, the takeout control section 22A operates for the sequence buffer 212 in Steps 22207 through 22211, which are similar to Steps 22202 through 22206.

Subsequently, the takeout control section 22A operates for the sequence buffer 213 in Steps 22212 through 22216, which are similar to Steps 22202 through 22206.

Finally, the takeout control section 22A operates for the sequence buffer 214 in Steps 22217 through 22221, which are similar to Steps 22202 through 22206.

Figure 9:
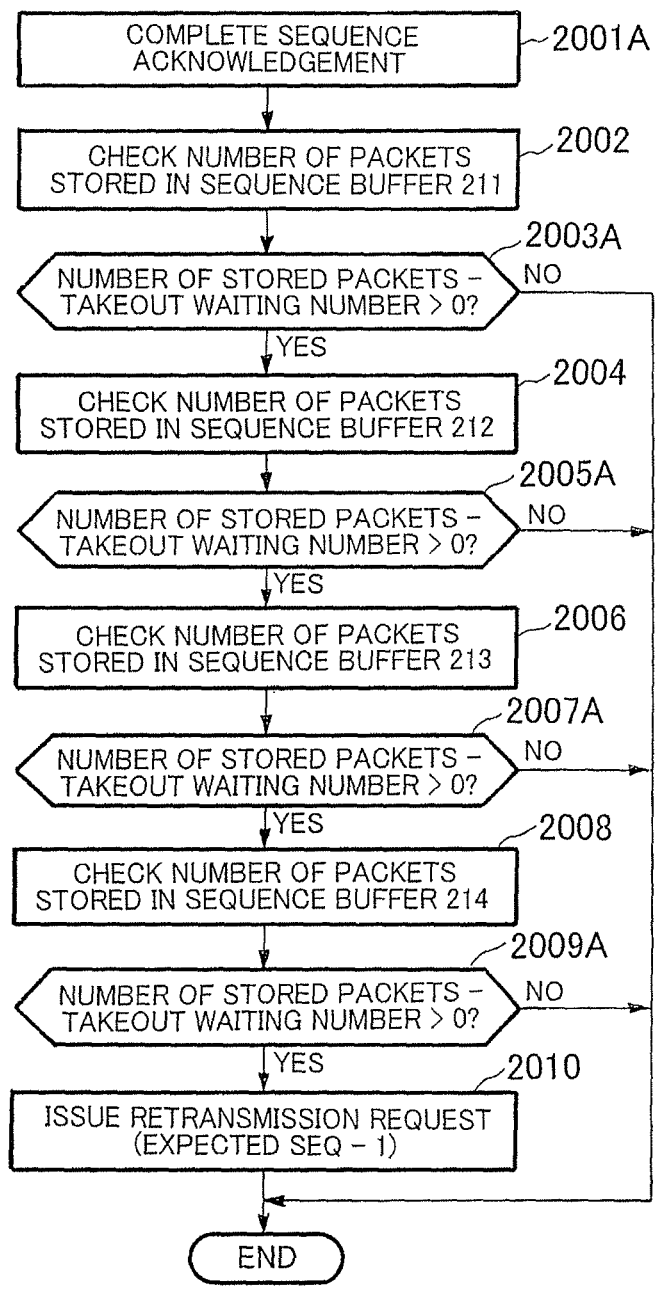
FIG. 9 is a flowchart of the packet takeout operation 223 of the takeout control section 22A.

Now, the operation of the absence detecting section 20A will be described below by referring to the flowchart of FIG. 9.

The absence detecting section 20A starts operating in response to the completion of the sequence acknowledging operation 221A (Step 2001A).

It checks the number of packets stored in the sequence buffer 211 (Step 2002).

When the number of packets stored in the sequence buffer 211 less the takeout waiting number of the sequence buffer 211 is equal to 0, the absence detecting section 20A ends the operation. When, on the other hand, the number of packets stored in the sequence buffer 211 less the takeout waiting number of the sequence buffer 211 is not less than 1, the absence detecting section 20A moves to Step 2004 (Step 2003A).

The absence detecting section 20A operates in Steps 2004 and 2005A for the sequence buffer 212 as it does in Steps 2002 and 2003A for the sequence buffer 211.

Then, the absence detecting section 20A operates in Steps 2006 and 2007A for the sequence buffer 213 as it does in Steps 2002 and 2003A for the sequence buffer 211.

Thereafter, the absence detecting section 20A operates in Steps 2008 and 2009 for the sequence buffer 214 as it does in Steps 2002 and 2003A for the sequence buffer 211.

When it is acknowledged that the total of the number of stored packets less the takeout waiting number in each of all the sequence buffers 211 through 214 is not less than 1 as a result of the execution of Steps 2002 through 2009A, it issues a retransmission request to the ACK transmitting section. Then, the ACK transmitting section generates an ACK (duplicate ACK) containing the SEQ same as the ACK it transmitted last time and issues a retransmission request to the transmitter 1 (Step 2010).

Operation Example (Example of Absence Detecting Operation in Normal Operation)

Now, an example of absence detecting operation of the absence detecting section 20A in a no packet loss condition (normal operation) will be described below by referring to FIG. 10.

Figure 10:
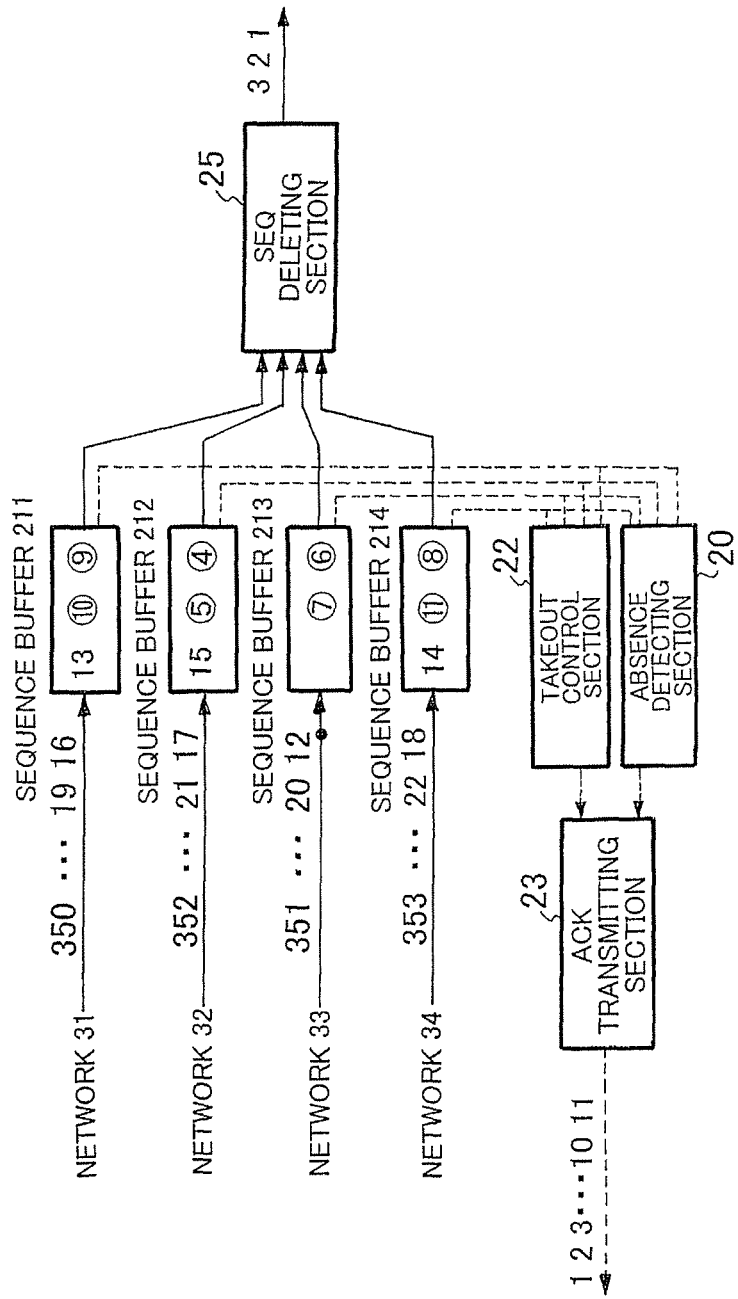
FIG. 10 is a block diagram of an exemplar normal operation of the absence detecting section 222A.

FIG. 10 shows an instance where the network 33 shows a delay greater than the networks 31, 32 and 34 and hence the arrival of the packet with SEQ=12 is delayed.

Since the delay of any of the networks 31, 32 and 34 is smaller than the network 33, packets arrive from those networks earlier for the sequence buffers 211, 212 and 214 than the packets arriving from the network 33.

In the instance of FIG. 10, the operation of sequence acknowledgement of the packets with SEQ 1 through SEQ 11 has been completed as a result of the sequence acknowledging operation 221A and the ACK transmitting section 23 has transmitted ACK 1 through ACK 11 to these packets. Additionally, the packets with SEQ 1 through SEQ 3 have been transferred to the SEQ deleting section 25 as a result of the packet takeout operation 222. While the operation of sequence acknowledgement of the packets with SEQ 4 through SEQ 11 has been completed, they are waiting for a takeout request from the SEQ deleting section 25 in the sequence buffers 211 through 214.

In the condition of FIG. 10, since the packet 12 is on the network 33 and not stored in the sequence buffer 212, the sequence acknowledging operation 221A is completed when the sequence acknowledgement operation of the packet with SEQ=11 is completed and the absence detecting section 20A is notified of the completion of packet takeout operation.

The absence detecting section 20A checks the number of packets stored in the sequence buffers 211 through 214 and the number of packets in a takeout waiting status. While the number of stored packet is 3 and the number of takeout waiting packets is 2 for the sequence buffers 211, 212 and 214, the number of stored packet is 2 and the number of takeout waiting packets is 2 to make the number of stored packets less the takeout waiting number equal to 0 so that it is considered that there is not any absence and the operation is completed.

As described above, when no inversion of sequence arises in any of the networks 31 through 34 and no packet loss takes place, the number of stored packets less the takeout waiting number becomes equal to 0 without fail in one or more the sequence buffers 211 through 214.

Since the sequence buffers 211 through 214 stores packets whose number corresponds to the difference of delay time of the networks 31 through 34 in a condition where no packet loss takes place, the number of packets stored in the sequence buffer that stores the packets of the network whose delay is largest (the sequence buffer 213 in FIG. 10) is equal to 0. (Example of Absence Detecting Operation in Abnormal Operation)

Now, an example of the absence detecting operation 222 in a condition where a packet loss arises (abnormal operation) will be described below by referring to FIG. 11.

Figure 11:
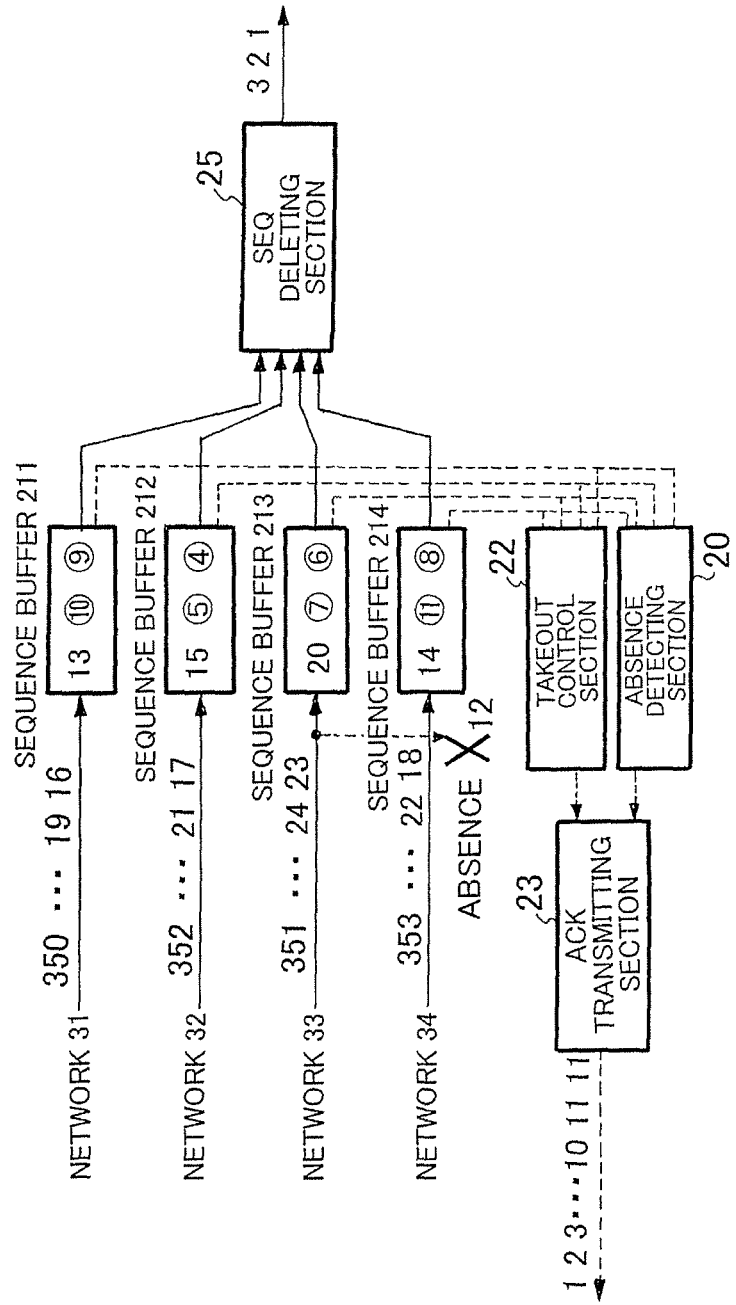
FIG. 11 is a block diagram of an exemplar abnormal operation of the absence detecting section 222A.

FIG. 11 shows an instance where the packet with SEQ=12 is lost on the network 33.

Assume that the network 33 shows a delay that is greater than the other networks 31, 32 and 34. In other words, packets arrive earlier for the sequence buffers 211, 212 and 214 than for the sequence buffer 213 because the networks 31, 32 and 34 show a delay smaller than the network 33.

In the instance of FIG. 11, the operation of sequence acknowledgement is completed for the packets with SEQ 1 through SEQ 11 by the sequence acknowledging operation 221A and the ACK transmitting section 23 has transmitted ACK 1 through ACK 11 for these packets. Additionally, the packets with SEQ 1 through SEQ 3 have been transferred to the SEQ deleting section 25 as a result of the packet takeout operation 223. While the operation of sequence acknowledgement of the packets with SEQ 4 through SEQ 11 has been completed, they are waiting for a takeout request from the SEQ deleting section 25 in the sequence buffers 211 through 214.

The sequence acknowledging operation 221A starts when the packet with SEQ=20, which is sent out to the network 33 next to the absent packet with SEQ=12, is stored in the sequence buffer 213. However, since there is not any packet for which sequence acknowledge can be performed, the absence detecting operation 222A is immediately started.

Then, the absence detecting section 20 checks the number of packets stored in the sequence buffers 211 through 214.

Since the number of stored packets is 3 and the takeout waiting number is 2 so that the number of stored packets less the takeout waiting number is equal to 1 in all the sequence buffers including the sequence buffer 213, it is considered that there is an absence of packet. Thus, a retransmission request is issued to the ACK transmitting section 23.

As the ACK transmitting section 23 receives the retransmission request as a result of the absence detecting operation 222A in the takeout control section 22, it transmits ACKs including the ACK with SEQ=11 same as the ACK (ACK=11) it transmitted last time. Since the ACKs with the same numbers arrive consecutively, the transmitter 1 determines that there is a retransmission request and retransmits the packets in the retransmission buffer.

As described above, when no inversion of sequence takes place in each of the networks 31 through 34 and a packet loss arises, the relationship of the number of stored packets–takeout waiting number>0 holds true in all the sequence buffers 211 through 214. A packet loss can be determined by means of this feature and hence a retransmission request can be issued very quickly.

Advantages of this Embodiment

The advantages of this embodiment will be described below.

According to the present invention as described above by way of this embodiment, any packet loss can be detected very quickly by using sequence numbers of a single stage in a multi-path environment where a transmitter and a receiver are connected to each other by way of a plurality of networks when no inversion of sequence of packets arises in each of the related networks.

This is because the absence detecting section of the receiver monitors the packets staying in the sequence guaranteeing buffer arranged in each of the networks, paying attention to the characteristic that packets are stored in the sequence buffers of all the networks when a packet loss takes place.

Additionally, according to the present invention as described above by way of this embodiment, a retransmission of packets can be started very quickly when a packet loss takes place, utilizing the management of sequence numbers of a single stage in a multi-path environment where a transmitter and a receiver are connected to each other by way of a plurality of networks when no inversion of sequence of packets arises in each of the related networks.

This is because the absence detecting section of the receiver monitors the packets staying in the sequence guaranteeing buffer arranged in each of the networks, paying attention to the characteristic that packets are stored in the sequence buffers of all the networks when a packet loss takes place so that an absence of a packet can be detected very quickly without relying on a retransmission timer.

Configuration of Third Embodiment

The third embodiment of the present invention differs from the first embodiment in that storage control sections 271 through 274 are arranged respectively between the networks 31 through 34 and the sequence buffers 211 through 214 so that the sequence buffers can detect any absence of a packet due to overflow.

Either or both of the absence detecting feature of this embodiment and the absence detecting feature (absence detecting operation 222) of the first embodiment may be used. In the following description, it is assumed that the absence detecting operation 222 is not realized when the sequence acknowledging operation 221 is completed (and hence the absence detecting feature of the first embodiment is not combined).

(Description of Configuration)

Now, the configuration of this embodiment will be described by referring to FIG. 12.

The transmitter 1 has a configuration same as the transmitter 1 of the first embodiment and operates in the same manner.

The receiver 2 differs from the receiver 2 of the first embodiment in that it additionally has storage control sections 271 through 274 that are arranged respectively between the networks 31 through 34 and the sequence buffers 211 through 214.

The storage control section 271 operates in a manner as described below.

(1) It compares the sequence number of the packet arriving from the network 31 and the sequence number of the packet that arrived last time from the network 31 and, when the SEQ of the packet that arrives this time is smaller than or equal to the SEQ of the packet that arrived last time, it considers that a retransmission takes place and abandons all the packets it has stored.

(2) It checks the number of stored packets of the sequence buffer 211 when a packet arrives from the network 31 and, when the maximum storable number is exceeded if the arriving packets are stored, it abandons all the packets it has stored and issues a retransmission request.

(Description of Operation)

Now, the operation of the storage control section 271 will be described below by referring to the flowchart of FIG. 13.

As a packet arrives from the network 31, the storage control section 271 starts a storage control operation (Step 27101).

The storage control section 271 compares the sequence number of the arriving packet and the sequence number of the packet that arrived last time (Step 27102).

When the SEQ of the arriving packet is smaller than or equal to the SEQ of the packet that arrived last time, the storage control section 271 determines that a retransmission takes place and abandons all the packets it stores in the sequence buffer 211. However, if there is a takeout waiting packet as described above by referring to the second embodiment, it does not abandon the takeout waiting packet but abandons all the packets except the takeout waiting packet (Step 27103).

It records the SEQ of the arriving packet so that it can make a determination of Step 27102 when a packet arrives next time (Step 27104).

It then checks the number of packets stored in the sequence buffer 211 (Step 27105).

Thereafter, it compares the number of packets stored in the sequence buffer 211 (number of stored packets) and the maximum storable number of the sequence buffer 211 (Step 27106).

If the number of stored packets is equal to the maximum storable number, overflow occurs in the sequence buffer when the arriving packet is stored there. Therefore, it abandons all the packets stored in the sequence buffer 211. However, if there is a takeout waiting packet as described above by referring to the second embodiment, it does not abandon the takeout waiting packet but abandons all the packets except the takeout waiting packet (Step 27107).

There is an absence of a packet as a result of the abandon in Step 27107, the storage control section 271 issues a retransmission request to the ACK transmitting section 23. The storage control section 271 may end the operation (END) at this time or stores the arriving packet in Step 27109. When it stores the arriving packet, the packet will be abandoned when a retransmission takes place in response to the retransmission request issued in this step as a result of the retransmission detecting operation of Step 27103.

The storage control section 271 stores the arriving packet in the sequence buffer 211 (Step 27109).

The storage control section 271 starts the sequence acknowledging operation 221 (Step 27110).

Operation Example (Operation Example at Time of Overflow of Sequence Buffer)

The operation that is performed when the sequence buffer 211 overflows will be described by referring to FIG. 12.

Figure 12:
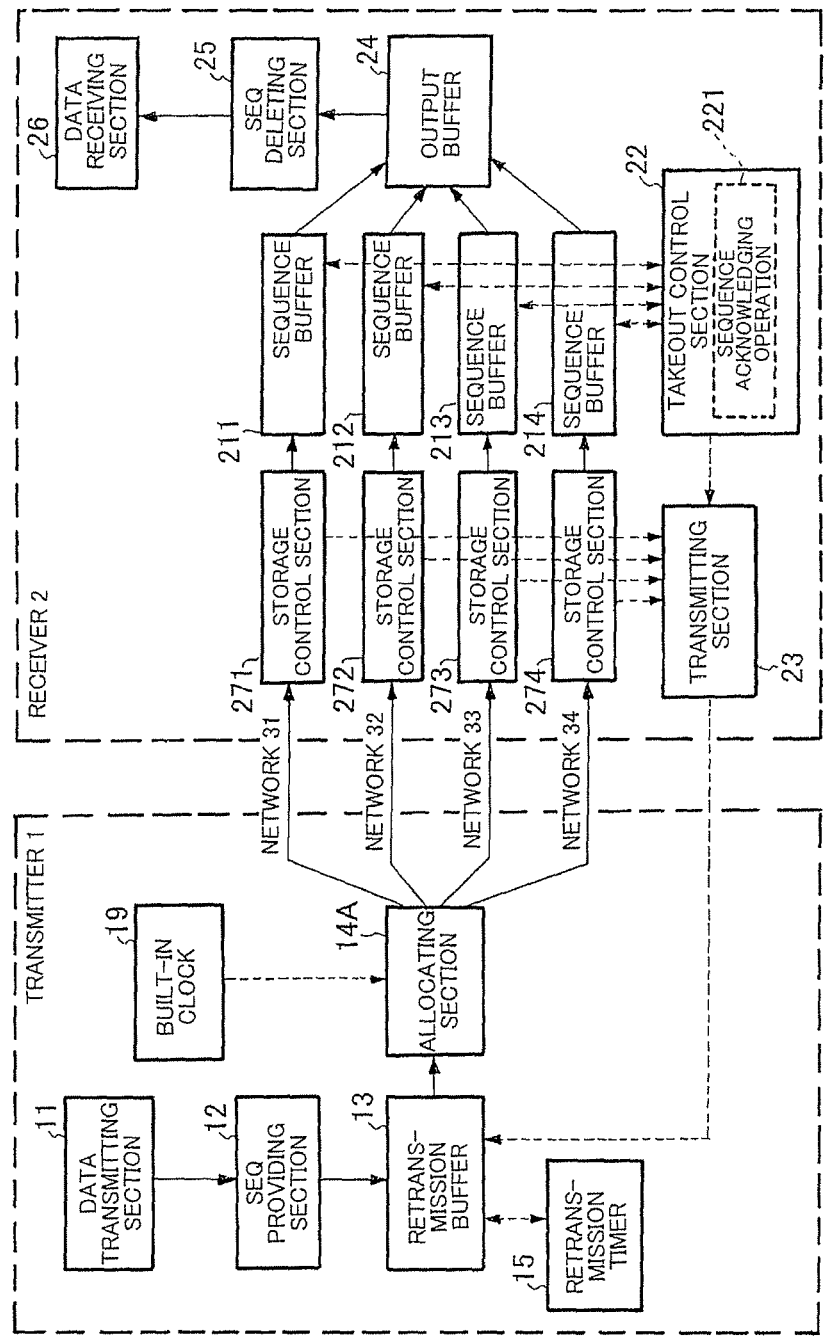
FIG. 12 is a schematic block diagram according to a third embodiment of the present invention, showing the configuration thereof.

Assume that packets of the number equal to the maximum storable number have already been accumulated in the sequence buffer 211 of FIG. 12. Also assume that the sequence of the packet that arrived last to the storage control section 271 is 26. Additionally, assume that the maximum storable number of the sequence buffer 211 is 40. Finally, assume that the sequence acknowledgement has been completed down to SEQ=55 and ACK=55 is transmitted.

As a packet (SEQ=133) arrives from the network 31 to the receiver 2 in the above-described condition, the packet is handed over to the storage control section 271.

Firstly, the storage control section 271 compares the SEQ (133) of the arriving packet and the SEQ (126) of the packet that arrived last and determines that no retransmission takes place because the SEQ of the arriving packet is greater than that of the last SEQ.

Then, the storage control section 271 checks the number of packets already stored in the sequence buffer 211. Since 40 packets are stored currently and the number of 40 is equal to the maximum storable number, it abandons all the 40 packets that are already stored and issues a retransmission request to the ACK transmitting section 23.

As the ACK transmitting section 23 receives the retransmission request from the storage control section 271, it transmits the ACK (ACK=55) including the SEQ (55) of the ACK which it transmitted last time and is stored in the ACK transmitting section 23.

The retransmission buffer 13 in the transmitter 1 receives the ACK=55 from the receiver 2. Since the SEQ of the ACK is same as the SEQ of the ACK that arrived last time, it sequentially retransmits all the packets in the retransmission buffer, starting from the packet with SEQ=56, to the allocating section 14.

The allocating section 14 allocates the packets retransmitted from the retransmission buffer to the networks 31 through 34. Assume that the packet with SEQ=56 is allocated to the network 31.

In the above-described condition, as the packet (SEQ=56) arrives from the network 31, it is handed over to the storage control section 271.

The storage control section 271 firstly compares the SEQ (56) of the arriving packet and the SEQ (126) of the packet that arrived last time and since the SEQ of the arriving packet is smaller than the SEQ of the packet that arrived last time, it determines that a retransmission takes place and abandons all the packets stored in the sequence buffer 211. Then, it stores the packets that arrive this time sequentially in the sequence buffer 211.

As described above, when the sequence buffer 211 overflows, the storage control section 271 determines that a packet loss arises due to a buffer flush (abandonment of all) and issues a retransmission request.

The sequence guaranteeing buffer overflows when the takeout control section 22 cannot takes out any packet from the sequence buffer because of a trouble such as packet loss. In such a condition, it is difficult to restore the normal condition in many cases without retransmission. When the buffer overflows, the packets that are already staying in the sequence buffer become useless after a retransmission.

Without the packet loss determining feature as described above for this embodiment, the receiver 2 cannot issue a retransmission request to the transmitter 1 in a multi-path environment. In other words, the transmitter 1 can only retransmit packets by means of the retransmission timer 15. However, a large value not less than 1 RTT generally needs to be defined for the retransmission timer 15 in order to prevent any operation error from taking place and hence it takes time before starting a packet retransmission.

However, with the packet loss determining feature of this embodiment, a packet loss can be determined because the sequence buffer 211 overflows. In short, a packet loss can be determined (and a retransmission request can be issued) very quickly if compared with determination of a packet loss by means of a retransmission timer.

As packets arrive as a result of retransmission, if the packets arrive due to retransmission or not is determined by seeing the sequence number. A buffer flush (abandonment of all) takes place when it is determined that the packets arrive due to retransmission. Then, on the fly packets that are not necessary due to retransmission can be abandoned appropriately.

Advantages of this Embodiment

The advantages of this embodiment will be described below.

According to the present invention as described above by way of this embodiment, any packet loss can be detected very quickly by using sequence numbers of a single stage in a multi-path environment where a transmitter and a receiver are connected to each other by way of a plurality of networks when no inversion of sequence of packets arises in each of the related networks.

This is because the storage control section of the receiver monitors the overflow, if any, of the sequence buffer arranged in each of the networks, paying attention to the characteristic that no packet can be taken out from a sequence buffer in an abnormal situation and overflow takes place in the buffer.

Additionally, according to the present invention as described above by way of this embodiment, a retransmission of packets can be started very quickly when a packet loss takes place, utilizing the management of sequence numbers of a single stage in a multi-path environment where a transmitter and a receiver are connected to each other by way of a plurality of networks when no inversion of sequence of packets arises in each of the related networks.

This is because the storage control section of the receiver monitors the overflow, if any, of the sequence buffer arranged in each of the networks, paying attention to the characteristic that no packet can be taken out from a sequence buffer in an abnormal situation and overflow takes place in the buffer.

Configuration of Fourth Embodiment

Unlike the third embodiment, the maximum storable number (capacity) of the sequence buffers 211 through 214 is determined from the band and the difference of delay time of the networks 31 through 34 to make the operation of abnormality detection (starting a retransmission) due to an overflowing sequence buffer a quick one.

The sequence buffers 211 through 214 are for absorbing any difference of delay time of the networks 31 through 34. Therefore, the sequence buffers are required to have a magnitude equal to the product of "the difference of the largest going and returning delay time and the smallest going and returning delay time of the networks 31 through 34" and "the band of the networks 31 through 34". When there arises a situation where packets are accumulated in the sequence buffers 211 through 214 beyond this magnitude, the situation may be considered as a situation where a packet loss takes place. The abnormality detection feature and the retransmission starting feature of the third embodiment are made quicker in this embodiment by utilizing this characteristic aspect.

(Description of Configuration)

Figure 14:
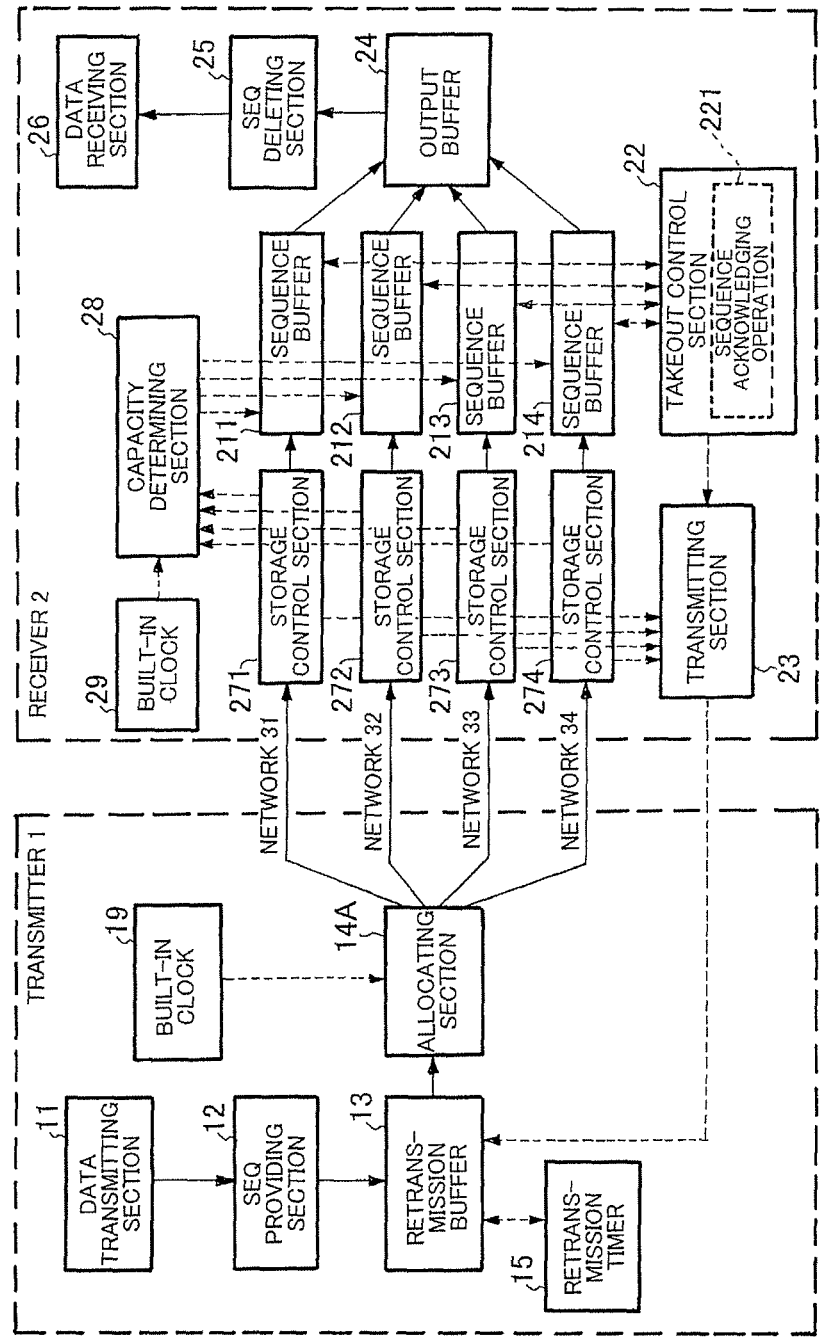
FIG. 14 is a schematic block diagram according to a fourth embodiment of the present invention, showing the configuration thereof.

Now, the configuration of this embodiment will be described by referring to FIG. 14.

The transmitter 1 of the fourth embodiment differs from that of the third embodiment illustrated in FIG. 12 in that the allocating section 14 of the first embodiment is denominated as allocating section 14A and a built-in clock 19 is added.

The allocating section 14A of the fourth embodiment differs from the allocating section 14 of the first embodiment in that it has a functional feature of describing the clock time information provided by the built-in clock 19 when it receives packets from the retransmission buffer 13 and transfers them to the networks 31 through 34 in addition to the operation of the allocating section 14 of the first embodiment.

The built-in clock 19 is a clock internally contained in the transmitter 1 in order to provide the allocating section 14 with clock time information.

The receiver 2 differs from that of the third embodiment illustrated in FIG. 12 in that it additionally has a capacity determining section 28 and a built-in clock 29.

The capacity determining section 28 receives the band information of the networks 31 through 34 and the transmission clock time information described in the header of the arriving packet from the storage control sections 271 through 274. It also receives clock time information from the built-in clock 29 and computationally determines the going and returning delay time of each of the networks. Then, it determines the maximum storable number (capacity) of the sequence buffers 211 through 214 from the going and returning delay time it computationally determines and the band.

The built-in clock 29 is a clock contained in the receiver 2 in order to provide the capacity determining section 28 with clock time information. The built-in clock 29 may or may not be synchronized with the built-in clock 19.

Operation Example (When Built-in Clock 19 and Built-in Clock 29 are Synchronized)

The operation of the capacity determining section 28 that is conducted when the built-in clock 19 and the built-in clock 29 are synchronized and a packet is transmitted to the network 31 will be described below by referring to FIG. 14.

A packet is transmitted from the retransmission buffer 13 in the transmitter 1 and arrives at the allocating section 14A.

The allocating section 14A acquires clock time information from the built-in clock 19 and buries the clock time information in the head of the packet arriving from the retransmission buffer 13. Then, it transmits the packet to the network 31.

As the storage control section 271 in the receiver 2 receives the packet from the network 31, it notifies the capacity determining section 28 of the number of bytes received from the network 31 per unit time (reception rate, to be referred to as band hereinafter) and the transmission clock time information described in the packet.

As the capacity determining section 28 receives the notice of the band and the transmission clock time from the storage control section 271, it acquires the reception clock time from the built-in clock 29. Then, it computationally determines the going and returning delay time (RTT) of the network 31 on the basis of the formula shown below and records it.

RTT=(reception clock time−transmission clock time)×2

The capacity determining section 28 compares the recorded RTTs of the networks 31 through 34 and finds out the largest (largest RTT) and the smallest (smallest RTT). Then, it determines the capacity of the sequence guaranteeing buffer 211 by means of the formula shown below.

capacity of sequence buffer 211=(largest RFT−smallest RTT)×band of network 31

As the sequence guaranteeing buffer 211 is notified of the capacity by the capacity determining section 28, it defines the largest storable quantity (appropriately reduced to the number of bits, the number of bytes or the number of some other units).

While the operation of determining the capacity of the sequence buffer 211 that takes place when a packet is transmitted to the network 31 is described above as an example, the capacities of the sequence buffers 212 through 214 can also be determined when packets are transmitted to the networks 32 through 34 respectively.

The capacity of the sequence buffers that is determined by the above-described operation can absorb the difference of delay time of the networks 31 through 34. If packets are accumulated beyond the capacity (and hence overflow takes place in some of the sequence buffers), it is because of an abnormal situation such as a packet loss that takes place there. Therefore, with this embodiment, the capacity of the sequence buffers 211 through 214 is defined to be as small as possible so that an abnormal situation can be detected quickly so that a retransmission of packets can be started very quickly if compared with an arrangement of using a retransmission timer.

(When Built-in Clock 19 and Built-in Clock 29 are not Synchronized)

When the built-in clock 19 and the built-in clock 29 are not synchronized with each other and the clock time of the built-in clock 29 is moving ahead of the clock time of the built-in clock 19 by $\alpha$, the largest and smallest RTTs can be expressed by the respective formulas shown below.

largest RTT=(reception clock time a+$\alpha$−transmission clock time a)×2 smallest RTT=(reception clock time b+$\alpha$−transmission clock time b)×2

Then, the capacity of the sequence buffers can be expressed by the formula shown below.

$$\begin{aligned}\text{sequence buffer capacity} =\ & (\text{largest } RTT - \text{smallest } RTT) \times \text{band} \\ =\ & \{(\text{reception clock time } a + \alpha - \\ & \text{transmission clock time } a) - (\text{reception} \\ & \text{clock time } b + \alpha - \text{transmission clock} \\ & \text{time } b)\} \times 2 \times \text{band}\end{aligned}$$

-continued
$$= (\text{reception clock time } a - \text{transmission clock time } a - \text{reception clock time } b + \\ \text{transmission clock time } b) \times 2 \times \text{band}$$

As seen from the above formula, as offset each other. Thus, the capacity of the sequence buffers can be determined when the built-in clock 19 and the built-in clock 29 are not synchronized with each other and the clock time of the built-in clock 29 is moving ahead of the clock time of the built-in clock 19 by $\alpha$.

Advantages of this Embodiment

The advantages of this embodiment will be described below.

According to the present invention as described above by way of this embodiment, any packet loss can be detected very quickly by using sequence numbers of a single stage in a multi-path environment where a transmitter and a receiver are connected to each other by way of a plurality of networks when no inversion of sequence of packets arises in each of the related networks.

This is because, when the storage control section of the receiver monitors the overflow, if any, of the sequence buffer arranged in each of the networks and detects the trouble, the capacity determining section of the receiver defines a necessary minimal capacity as the capacity of the sequence buffers from the difference of delay time and the band, paying attention to the characteristic that no packet can be taken out from a sequence buffer in an abnormal situation and overflow takes place in the buffer.

Additionally, according to the present invention as described above by way of this embodiment, a retransmission of packets can be started very quickly when a packet loss takes place, utilizing the management of sequence numbers of a single stage in a multi-path environment where a transmitter and a receiver are connected to each other by way of a plurality of networks when no inversion of sequence of packets arises in each of the related networks.

This is because, when the storage control section of the receiver monitors the overflow, if any, of the sequence buffer arranged in each of the networks and utilizes the overflow as trigger for starting a retransmission, the capacity determining section of the receiver defines a necessary minimal capacity as the capacity of the sequence buffers from the difference of delay time and the band, paying attention to the characteristic that no packet can be taken out from a sequence buffer in an abnormal situation and overflow takes place in the buffer.

Configuration of Fifth Embodiment

Unlike the first embodiment adapted to retransmit packets by means of GO-BACK-N, the fifth embodiment is adapted to retransmit selectively only the absent packet by means of Selective ACK.

(Description of Configuration)

Now, the configuration of this embodiment will be described by referring to FIG. 15.

The transmitter 1 of the fifth embodiment differs from that of the first embodiment illustrated in FIG. 1 in that the retransmission buffer 13, the sequence buffers 211 through 214 and the ACK transmitting section 23 of the first embodiment are denominated respectively as retransmission buffer 13A, sequence buffers 211A through 214A and ACK transmitting section 23A and an overtaking buffer 215 and storage control sections 271A through 274A are added.

The retransmission buffer 13A performs the following operation in addition to the operations (1) through (5) described above for the retransmission buffer 13 of the first embodiment.

(6) It receives a delivery negative acknowledgement (NACK) from the ACK transmitting section 23 and retransmits a copy of the packet showing the value of sequence number described in the NACK to the allocating section 14.

Like the sequence buffer 211, the sequence buffer 211A is an FIFO buffer. It receives packets from the network 31 and temporarily stores them. Then, it transmits a storage completion notice to the takeout control section 22. It also transfers the packets it stored in the output buffer 24 according to the directive from the takeout control section 22. However, unlike the sequence buffer 211, it compares the sequence number of the packet arriving from the network 31 and the sequence number of the packet that arrived from the network 31 last time but it neither considers that a retransmission takes place nor abandons all the stored packet when the SEQ of the arriving packet is smaller than or equal to the SEQ of the packet that arrived last time.

The sequence buffers 212A through 214A operate just like the sequence buffer 211A.

The overtaking buffer 215 receives the packet retransmitted from any of the storage control sections 271A through 274A due to NACK and notifies the takeout control section 22 of the storage thereof. Then, it transfers the packet that is being stored to the output buffer 24 according to the directive from the takeout control section 22. The storage control section 22 takes the overtaking buffer 215 for a buffer similar to any of the sequence buffers 211A through 214A.

The ACK transmitting section 23A operates in a manner as described below. While the present invention is described in terms of a 1 ACK system, with which the ACK transmitting section 23 transmits an ACK of a packet each time the transfer of a packet to the output buffer 24 is completed, an N_ACK system, with which the ACK transmitting section 23 transmits an ACK of N (N being a natural number not less than 1) arriving packets, may alternatively be used for the purpose of the present invention.

(1) As it receives the SEQ notice of the packet transferred to the output buffer 24 from the takeout control section 23, it generates a delivery acknowledged packet including the SEQ (to be referred to as ACK hereinafter) and notifies the retransmission buffer 13A thereof. It notifies the retransmission buffer 13A of the ACK by way of one of the networks 31 through 34. It stores the SEQ of which it is notified.

(2) As it receives a retransmission request from any of the absence detecting section 20 and the storage control sections 271A through 274A, it generates a NACK packet (delivery negative acknowledgement packet) of the value equal to SEQ+1 (the SEQ being stored in (1)) and notifies the retransmission buffer 13A thereof. It notifies the retransmission buffer 13A of the NACK by way of one of the networks 31 through 34. The NACK of (2) may be copied and transferred by way of all the networks 31 through 34. However, with such an arrangement, the retransmission buffer 13A may have to be provided with a lock mechanism so that a retransmission may not frequently take place at the retransmission buffer 13A.

Each of the storage control section 271A through 274A operates in a manner as described below.

(1) It compares the sequence number of the packet arriving from the network 31 and the sequence number of the packet that arrived last time from the network 31 and transfers the packet to the overtaking buffer 215, considering that a retransmission takes place, when the SEQ of the arriving packet is smaller than or equal to the SEQ of the packet that arrived last time.

(2) It transfers the packet arriving from the network 31 to the sequence buffer 211A when no transmission takes place as a result (1). Then, it checks the number of packets already stored in the sequence buffer 211A and, when the maximum storable number is exceeded if the arriving packet is stored, it abandons all the packets stored in the sequence buffer 211A and issues a retransmission request to the ACK transmitting section 23A.

(Description of Operation)

Now, the operation of the storage control section 271A will be described below by referring to the flowchart of FIG. 15.

Figure 13:
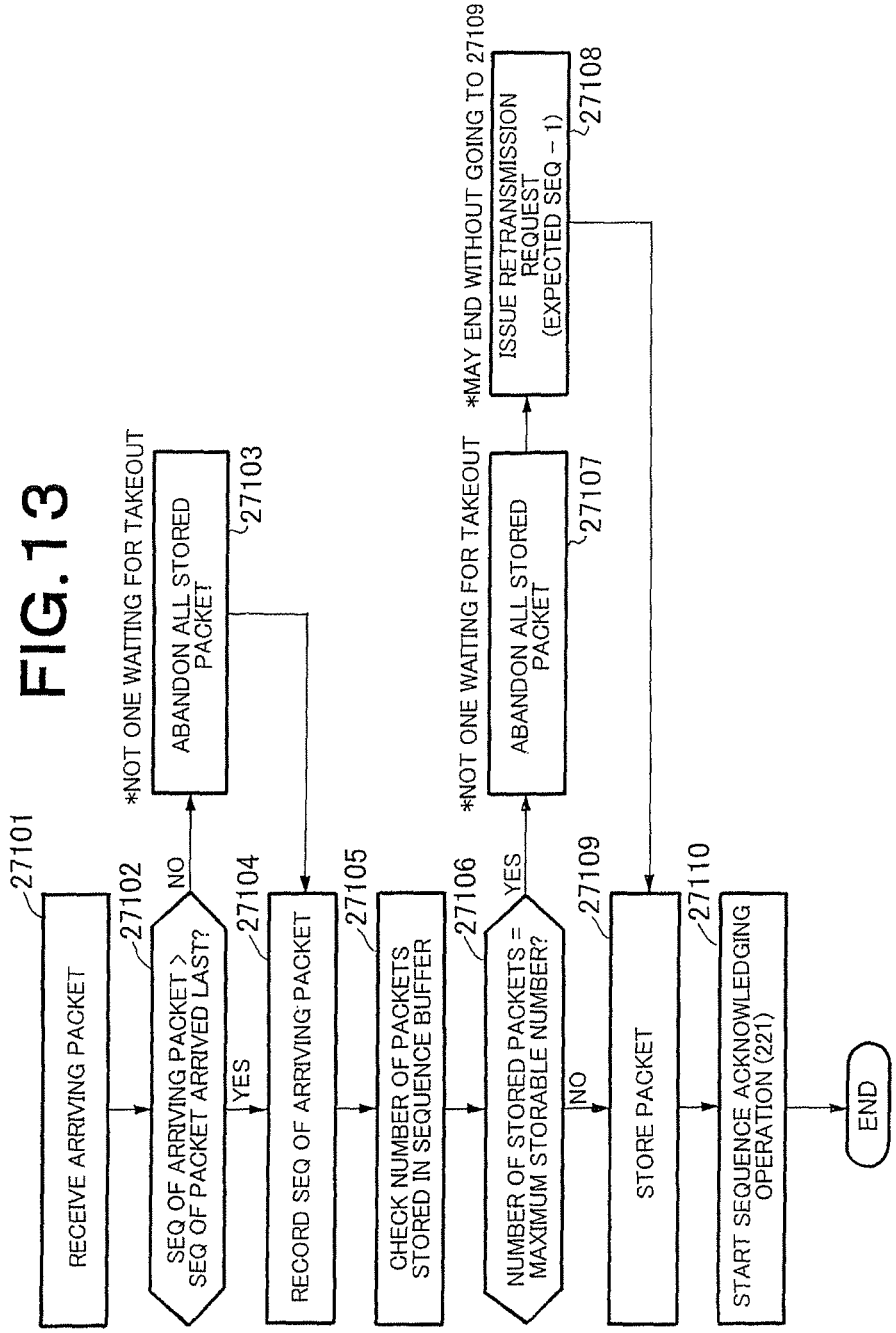
FIG. 13 is a flowchart of the operation of the storage control section 271.
Figure 15:
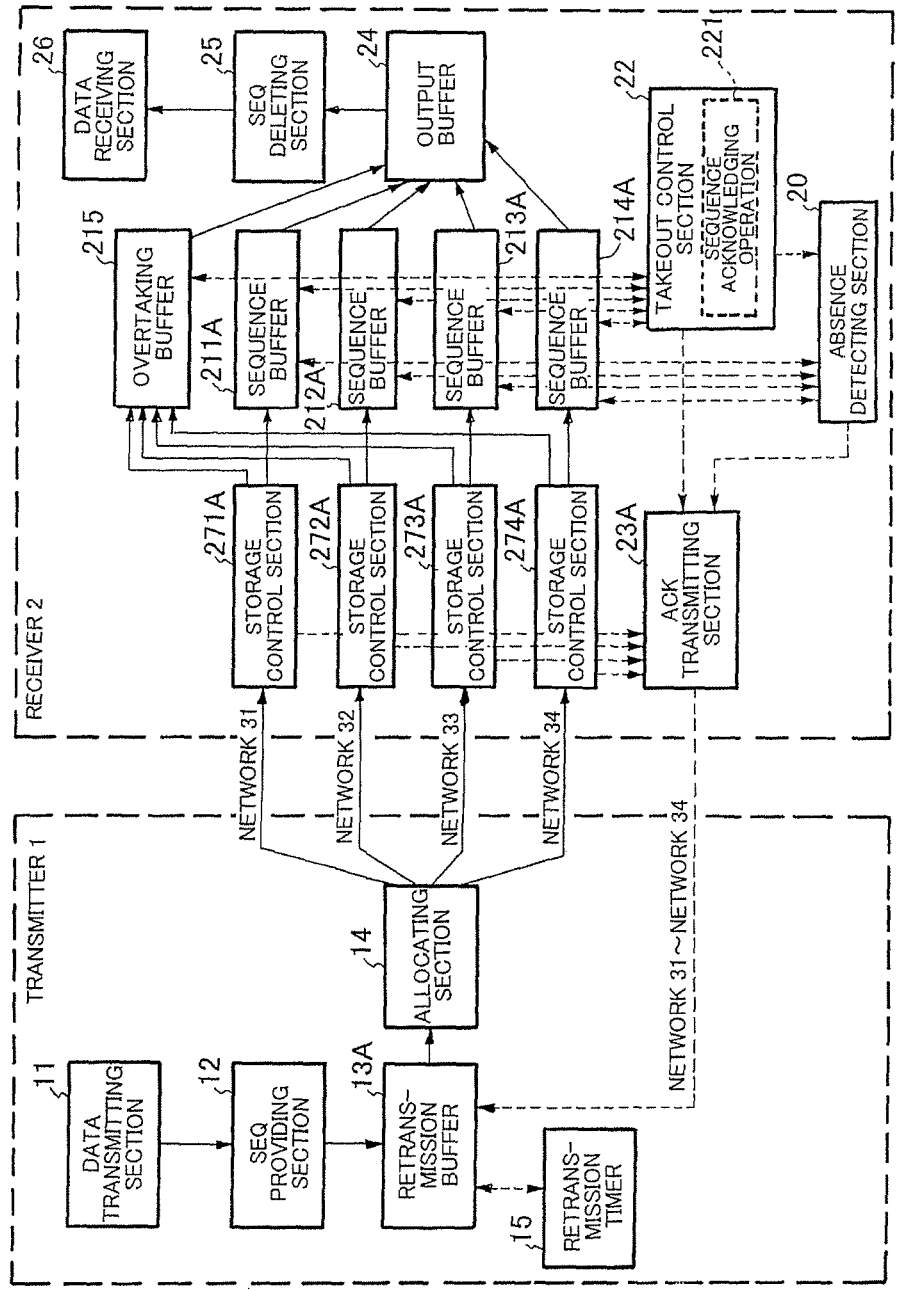
FIG. 15 is a schematic block diagram according to a fifth embodiment of the present invention, showing the configuration thereof.
Figure 16:
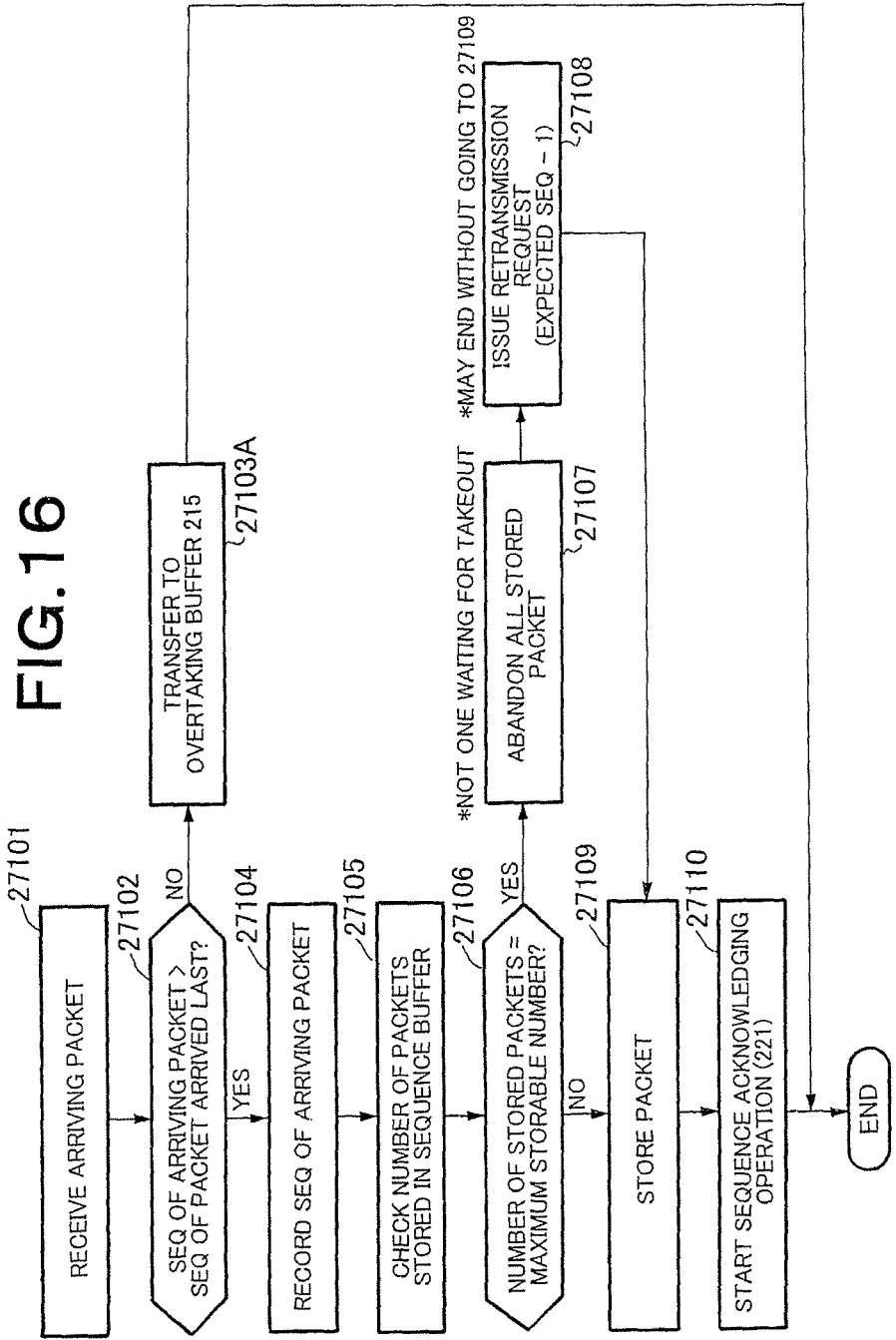
FIG. 16 is a flowchart of the operation of the storage control section 271A.

The operation of the storage control section 271A differs from that of the storage control section 271 shown in FIG. 13 in that the Step 27103 of FIG. 13 is replaced by Step 27103A in FIG. 15.

When the SEQ of the arriving packet is smaller than or equal to the SEQ of the packet that arrived last time, the storage control section 271A determines that a retransmission takes place and transfers the arriving packet to the overtaking buffer 215 and ends the operation (Step 27103A).

Operation Example (Example of Absence Detecting Operation in Abnormal Operation)

Now, an example of absence detecting operation of the absence detecting section 20 and that of the ACK transmitting section 23A in a condition where a packet loss arises (abnormal operation) will be described below by referring to FIG. 5. While the ACK transmitting section 23 is shown in FIG. 5, it is assumed that the ACK acknowledging section 23 is replaced by the ACK transmitting section 23A.

FIG. 5 shows an instance where the packet with SEQ=6 is lost on the network 33.

Assume that the network 33 shows a delay that is greater than the other networks 31, 32 and 34. In other words, packets arrive earlier for the sequence buffers 211, 212 and 214 than for the sequence buffer 213 because the networks 31, 32 and 34 show a delay smaller than the network 33.

In the instance of FIG. 5, the operation of sequence acknowledgement is completed for the packets with SEQ 1 through SEQ 5 and the packets are transferred to the output buffer 24. In return, ACK1 through ACK5 are sent out from the ACK transmitting section 23 for these packets.

The sequence acknowledging operation 221 starts when the packet with SEQ=12, which is sent out to the network 33 next to the absent packet with SEQ=6, is stored in the sequence buffer 213. However, since there is not any packet that can be sent out to the output buffer 24, the absence detecting section 20 is immediately notified of the completion of takeout operation.

Then, the absence detecting section 20 checks the number of packets stored in the sequence buffers 211 through 214. It checks the storage of packets in all the sequence buffers including the sequence buffer 213 and considers that there is an absence of a packet. Thus, it issues a retransmission request to the ACK transmitting section 23A.

As the ACK transmitting section 23A receives the retransmission request from the absence detecting section 20, it transmits NACKs (delivery negative acknowledgements) including the NACK with SEQ=6 obtained by adding 1 to the ACK (ACK=5) of the packet it transmitted last time. Since the NACKs arrive consecutively, the transmitter 1 determines that there is a retransmission request and retransmits the packet with SEQ=6.

The packet with SEQ=6 that is sent out by the retransmission is transferred to the overtaking buffer 215 and then from the overtaking buffer 215 to the output buffer 214 by the storage control sections 271A through 274A in the receiver 2.

As described above, any trouble can be detected very quickly and the tightness of the band for retransmission can be minimized by combining absence detection of the absence detecting section 20 and selective retransmission of only the absent packet by means of Selective ACK. Thus, a trouble detecting feature comparable to that of the conventional art 2 and a band tightness ratio also comparable to that of the conventional art 2 can be realized by means of a mechanism (using only a single stage of SEQ) simpler than that of the conventional art 2 by using such a system.

Advantages of the Embodiment

The advantages of this embodiment will be described below.

According to the present invention as described above by way of this embodiment, any packet loss can be detected very quickly by using the management of sequence numbers of a single stage in a multi-path environment where a transmitter and a receiver are connected to each other by way of a plurality of networks when no inversion of sequence of packets arises in each of the related networks.

This is because the absence detecting section of the receiver monitors the packets staying in the sequence guaranteeing buffer arranged in each of the networks, paying attention to the characteristic that packets are stored in the sequence buffers of all the networks when a packet loss takes place.

Additionally, according to the present invention as described above by way of this embodiment, a retransmission of packets can be started very quickly when a packet loss takes place, utilizing the management of sequence numbers of a single stage in a multi-path environment where a transmitter and a receiver are connected to each other by way of a plurality of networks when no inversion of sequence of packets arises in each of the related networks.

This is because the absence detecting section of the receiver monitors the packets staying in the sequence guaranteeing buffer arranged in each of the networks, paying attention to the characteristic that packets are stored in the sequence buffers of all the networks when a packet loss takes place so that an absence of a packet can be detected very quickly without relying on a retransmission timer.

While the term of packet is employed in the above description of the embodiments, it may be replaced by the term of frame (e.g. Ethernet™ frame).

While the present invention is described in detail above by way of preferable embodiments, the present invention is by no means limited to the above-described embodiments, which may be modified and altered in various different ways without departing from the spirit and scope of the present invention. Additionally, any of the above-described embodiments may be appropriately combined for use.

The present invention can find applications in Ethernet™ switches and routers for transferring a large volume of data at high speed by means of a plurality of networks and also in network interface cards (NICs) for connecting servers very quickly.

Although the exemplary embodiments of the present invention have been described in detail, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A first communication apparatus connected to a second communication apparatus via a plurality of networks in which no inversion of packet sequence occurs, the first communication apparatus comprising:
   a plurality of sequence buffers, each of which corresponds to a respective one of the plurality of networks and stores packets until a sequence acknowledgement is executed;
   a first control unit configured to take out the stored packets from the plurality of sequence buffers, based on sequence numbers included in the stored packets; and
   a plurality of second control units, each of which corresponds to a respective one of the plurality of sequence buffers, each second control unit removing the packets stored in its corresponding sequence buffer, and thereby emptying its corresponding sequence buffer, based on a predetermined condition related to the stored packets in its corresponding sequence buffer,
   wherein the predetermined condition is when a sequence number of packet which was most recently received by an associated sequence buffer is equal to or less than a sequence number of a last packet received by that sequence buffer.

2. The communication apparatus according to claim 1, wherein the predetermined condition further includes the fact that a number of the stored packets in the corresponding sequence buffer exceeds a threshold value.

3. The communication apparatus according to claim 1, wherein the first control unit takes out the stored packets from the plurality of sequence buffers, based on comparison between the sequence numbers included in the store packets and an expected sequence number which is incremented if the sequence number of the packet taken out from any sequence buffer in turn among the sequence buffers is the same as the expected sequence number.

4. The communication apparatus according to claim 1, further comprising:
   an ACK transmitting section for sending a retransmission request to the second communication apparatus when any of the plurality of second control units removes the packets stored in its associated sequence buffer, the retransmission request requesting the second communication apparatus to send a packet identified by the retransmission request and to send subsequent packets associated with the identified packet.

5. A communication system comprising a first communication apparatus and a second communication apparatus, the first communication apparatus being connected to the second communication apparatus via a plurality of networks in which no inversion of packet sequence occurs, the first communication apparatus including:
   a plurality of sequence buffers, each of which corresponds to a respective one of said plurality of networks and stores packets until a sequence acknowledgement is executed;
   a first control unit configured to take out the stored packets from the plurality of sequence buffers, based on sequence numbers included in the stored packets; and
   a plurality of second control units, each of which corresponds to a respective one of the plurality of sequence buffers, each second control unit removing the packets stored in its corresponding sequence buffer, and thereby emptying its corresponding sequence buffer, based on a predetermined condition related to the packets stored in its corresponding sequence buffer, and wherein the predetermined condition is when a sequence number of a packet which was most recently received by an associated sequence buffer is equal to or less than a sequence number of a last packet received by that sequence buffer.

6. The communication system according to claim 5, wherein the predetermined condition further includes the fact that a number of the stored packets in the corresponding sequence buffer exceeds a threshold value.

7. The communication system according to claim 5, wherein the first control unit takes out the stored packets from the plurality of sequence buffers, based on comparison between the sequence numbers included in the stored packets and an expected sequence number which is incremented if the sequence number of the packet taken out from any sequence buffer in turn among the sequence buffers is the same as the expected sequence number.

8. The communication apparatus according to claim 5, further comprising:

an ACK transmitting section for sending a retransmission request to the second communication apparatus when any of the plurality of second control units removes the packets stored in its associated sequence buffer, the retransmission request requesting the second communication apparatus to send a packet identified by the retransmission request and to send subsequent packets associated with the identified packet.

9. A communication method executed in a first communication apparatus connected to a second communication apparatus via a plurality of networks in which no inversion of packet sequence occurs, the first communication apparatus including a plurality of sequence buffers, each of which corresponds to a respective one of the plurality of networks, a first control unit, and a plurality of second control units, each of which correspond to a respective one of the plurality of sequence buffers, the communication method comprising the steps:

storing packets in the sequence buffers until a sequence acknowledgement is executed;

using the first control unit to remove the stored packets from the plurality of sequence buffers, based on sequence numbers included in the stored packets; and using each of the plurality of second control units to remove all of the packets stored in its corresponding sequence buffer, and thereby empty its corresponding sequence, based on a predetermined condition related to the packets stored in its corresponding sequence buffer, wherein the predetermined condition is when a sequence number of the packet which was most recently received by an associated sequence buffer is equal to or less than a sequence number of a last packet received by that sequence buffer.

10. The communication method according to claim 9, wherein the predetermined condition further includes the fact that a number of the stored packets in the corresponding sequence buffer exceeds a threshold value.

11. The communication method according to claim 9, wherein the first control unit takes out the stored packets from the plurality of sequence buffers, based on comparison between the sequence numbers included in the stored packets and an expected sequence number which is incremented if the sequence number of the packet taken out from any sequence buffer in turn among the sequence buffers is the same as the expected sequence number.

12. The communication method according to claim 9, further comprising the step:

using the ACK transmitting section to send a retransmission request to the second communication apparatus when any of the plurality of second control units removes the packets stored in its associated sequence buffer, the retransmission request requesting the second communication apparatus to send a packet identified by the retransmission request and to send subsequent packets associated with the identified packet.

* * * * *